(12) United States Patent
Studebaker et al.

(10) Patent No.: US 8,245,480 B2
(45) Date of Patent: Aug. 21, 2012

(54) FLUSH JOIST SEAT

(75) Inventors: Glenn Wayne Studebaker, Norfolk, NE (US); David Lee Samuelson, Madison, NE (US); Lionel Edward Dayton, Norfolk, NE (US)

(73) Assignee: Nucor Corporation, Charlotte, NC (US)

( * ) Notice: Subject to any disclaimer, the term of this patent is extended or adjusted under 35 U.S.C. 154(b) by 332 days.

(21) Appl. No.: 12/709,199

(22) Filed: Feb. 19, 2010

(65) Prior Publication Data
US 2010/0192507 A1 Aug. 5, 2010

Related U.S. Application Data

(63) Continuation-in-part of application No. 12/019,410, filed on Jan. 24, 2008.

(51) Int. Cl.
E04C 3/293 (2006.01)
E04B 5/17 (2006.01)

(52) U.S. Cl. .................. 52/655.1; 52/236.6; 52/289

(58) Field of Classification Search ........... 52/236.6, 52/236.7, 241, 289, 319, 321, 328, 334, 335, 52/414, 655, 690, 692, 702
See application file for complete search history.

(56) References Cited

U.S. PATENT DOCUMENTS

| | | | |
|---|---|---|---|
| 1,969,312 A * | 8/1934 | Macomber | ............ 52/692 |
| 2,053,873 A | 9/1936 | Niederhofer | |
| 2,597,837 A | 5/1952 | Lindsay | |
| 2,684,134 A | 7/1954 | Ruppel | |
| 2,703,003 A | 3/1955 | Ruppel | |
| 3,307,304 A | 3/1967 | Klausner | |
| 3,363,379 A | 1/1968 | Curran | |
| 3,392,499 A | 7/1968 | McManus | |
| 3,397,497 A | 8/1968 | Shea et al. | |
| 3,457,818 A | 7/1969 | McManus | |
| 3,527,007 A | 9/1970 | McManus | |
| 3,600,868 A | 8/1971 | Wilson et al. | |
| 3,624,980 A | 12/1971 | McManus | |
| 3,683,580 A | 8/1972 | McManus | |
| 3,719,015 A | 3/1973 | Misawa | |
| 3,728,835 A | 4/1973 | McManus | |
| 3,902,350 A | 9/1975 | McManus | |
| 4,003,179 A | 1/1977 | Gilb | |
| 4,056,908 A | 11/1977 | McManus | |
| 4,189,883 A | 2/1980 | McManus | |
| 4,259,822 A | 4/1981 | McManus | |
| 4,285,173 A | 8/1981 | Grearson et al. | |
| 4,295,310 A | 10/1981 | McManus | |
| 4,333,280 A | 6/1982 | Morton | |
| 4,432,178 A | 2/1984 | Taft | |
| 4,454,695 A | 6/1984 | Person | |
| 4,507,901 A | 4/1985 | Carroll | |

(Continued)

*Primary Examiner* — Brian Glessner
*Assistant Examiner* — Joseph J Sadlon
(74) *Attorney, Agent, or Firm* — Moore & Van Alllen, PLLC; W. Kevin Ransom

(57) ABSTRACT

A joist support system including a joist having a joist seat at least at one end, each joist seat having a first portion fastened to an upper chord of the joist and a second portion adapted to engage a support structure and support the joist and a bearing load, and a second steel plate welded to the main steel plate extending downwardly from the main steel plate between the first and second portions, the second steel plate fastened with an upward support portion to an end portion of the joist extending inwardly adapted to resist transfer load on the joist seat, and a support structure adapted to support the one end of the joist by a portion of the joist seat.

50 Claims, 19 Drawing Sheets

U.S. PATENT DOCUMENTS

| | | | |
|---|---|---|---|
| 4,527,372 A | 7/1985 | Ryan | |
| 4,566,240 A | 1/1986 | Schilger | |
| 4,587,782 A | 5/1986 | Shubow | |
| 4,592,184 A | 6/1986 | Person et al. | |
| 4,593,507 A | 6/1986 | Hartman | |
| 4,597,233 A | 7/1986 | Rongoe | |
| 4,619,090 A | 10/1986 | McManus | |
| 4,653,237 A | 3/1987 | Taft | |
| 4,700,519 A | 10/1987 | Person et al. | |
| 4,726,159 A | 2/1988 | Stohs | |
| 4,802,786 A | 2/1989 | Yauger et al. | |
| 4,845,908 A | 7/1989 | Stohs | |
| 4,878,323 A * | 11/1989 | Nelson | 52/92.2 |
| 5,054,755 A | 10/1991 | Hawkes | |
| 5,383,320 A | 1/1995 | Sorton | |
| 5,544,464 A | 8/1996 | Dutil | |
| 5,605,423 A | 2/1997 | Janusz | |
| 5,755,542 A | 5/1998 | Janusz et al. | |
| 5,761,873 A | 6/1998 | Slater | |
| 5,836,131 A | 11/1998 | Viola et al. | |
| 5,836,133 A | 11/1998 | Bergeron et al. | |
| 5,941,035 A | 8/1999 | Purse | |
| 6,064,755 A | 5/2000 | Some | |
| 6,230,467 B1 | 5/2001 | Leek | |
| 6,327,828 B1 * | 12/2001 | Carroll | 52/480 |
| 6,357,191 B1 | 3/2002 | Ault et al. | |
| 6,585,141 B2 | 7/2003 | Goss et al. | |
| 6,622,569 B2 | 9/2003 | Mallick et al. | |
| 6,668,510 B2 | 12/2003 | McManus | |
| 6,691,478 B2 * | 2/2004 | Daudet et al. | 52/289 |
| 6,761,005 B1 | 7/2004 | Daudet et al. | |
| 6,993,881 B1 | 2/2006 | Ruble et al. | |
| 7,013,613 B1 | 3/2006 | Boellner et al. | |
| 7,017,314 B2 | 3/2006 | Pace | |
| 7,028,435 B2 | 4/2006 | Walker et al. | |
| 7,389,620 B1 | 6/2008 | McManus | |
| 7,562,500 B2 | 7/2009 | Siu | |
| 8,146,794 B2 * | 4/2012 | Nose et al. | 228/110.1 |
| 2004/0231256 A1 * | 11/2004 | Ohnishi | 52/236.7 |
| 2005/0188638 A1 | 9/2005 | Pace | |
| 2006/0236815 A1 | 10/2006 | Beecherl et al. | |

\* cited by examiner

FLUSH JOIST SEAT

RELATED APPLICATIONS

This application is a continuation in part of U.S. patent application Ser. No. 12/019,410, filed Jan. 24, 2008, and incorporated herein by reference.

BACKGROUND AND SUMMARY

The present disclosure relates to the field of structural systems for buildings and, more particularly, to joist seats.

Large scale, multi-story buildings are typically constructed of steel and concrete. Floors in such buildings may be constructed by spanning wide flange beams or steel joists between structural supports and installing metal decking across the tops of such beams or joists. The decking forms a horizontal surface onto which concrete is placed. Generally, the bottoms of the beams or joists form the framework from which ceilings are hung. Flooring system designs must also be mindful of fire safety, acoustics, and vibration considerations.

In some prior systems, steel joists have been assembled with joist shoes fastened to the end of the joists, such that the joist and joist shoe were supported on a structural support such as a beam. The joists and joist shoes have generally been formed from angles, and when assembled, formed a generally I-beam shaped end to the joist. In some installations, the assembled joist and joist shoe were fastened to the top of the support structure, and a floor formed above the joist. In these configurations, the height of the joist and the joist shoe added to the height and weight of the building on each floor to maintain overall floor system height. While joist and deck floor systems have been designed in the past to address one or more of these issues individually, these prior designs are not optimized and integrated with the portions of the support structure of a building to provide an integrated design to address the above-mentioned issues in a systematic manner.

Presently disclosed is a joist support system comprising a joist having joist seat at least at one end, each joist seat comprising a main steel plate having a first portion fastened to an upper chord of the joist and a second portion adapted to engage a support structure and support the joist and a bearing load, and a second steel plate welded to the main steel plate and extending downwardly from the main steel plate between the first and second portions, the second steel plate fastened with an upward support portion to an end portion of the joist extending inwardly adapted to resist transfer load on the joist seat, and a support structure adapted to support the one end of the joist by a portion of the joist seat.

The joist support system may also have the end portion of the joist to which the second steel plate is fastened comprising a joist shoe positioned below and extending inwardly from the end of the joist to a second web member adapted to resist transfer loads on the joist seat. An opening may be provided in the main steel plate adapted to permit welding on a web member of the joist through the opening. The main steel plate may be capable of being fastened to the upper chord and the second steel plate may be capable of being fastened to the joist shoe or to the end portion of the joist after the joist is positioned. The second steel plate may include an L-shaped portion adapted to upwardly engage the end portion of the joist. Further, the main steel plate may be fastened to the support structure by self-aligning fasteners, and the support structure may be a support structure comprising cold formed metal studs, a masonry wall, a cementitious wall, a metal beam, a metal truss, or other supporting structures.

Also disclosed is a joist support system comprising a joist having joist seat at least at one end, each joist seat comprising a main steel plate having a first portion welded to an upper chord of the joist and a second portion adapted to engage a support structure and support the joist and a bearing load, and a second steel plate welded to the main steel plate and extending downwardly from the main steel plate between the first and second portions, the second steel plate welded with a lateral weld portion and an upward weld portion to an end portion of the joist extending inwardly to resist transfer load on the joist seat, and a support structure adapted to support the one end of the joist by a portion of the joist seat.

The joist support system may also have the end portion of the joist to which the second steel plate is fastened comprising a joist shoe positioned below the upper chord positioned adjacent at least one end of the joist, and with the second steel plate welded with a lateral weld portion and an upward weld portion to the joist shoe extending inwardly to resist transfer load on the joist seat. Additionally, the joist shoe may extend at least slightly beyond the end of the upper chord, and each joist shoe may comprise a pair of spaced apart inward facing L-shaped members with a web of the joist positioned there between extending inwardly along the upper chord to resist transfer load on the joist seat. The main steel plate may be pre-bent downwardly prior to applying a load to the joist such that the main steel plate moves to provide more support area with the support structure when the joist is loaded. The joist support system may also include corrugated decking supported by a plurality of the joist positioned laterally, with the decking extending over the main steel plate of the joist, and a cementitious slab placed over the corrugated decking. In another example, the joist support system may further include a plurality of stand-off fasteners positioned along the joist and coupled through the decking into the upper chord of the joist and extending above the decking, and a cementitious slab placed over the corrugated decking and encapsulating the stand-off fasteners. The stand-off fasteners may be positioned along the joist with spacing between stand-off fasteners greater at center portions of the joist than at the end of the joist adjacent to joist seat.

Also disclosed is a method of constructing a joist support system comprising assembling a joist seat comprising a main steel plate having a first portion adapted to fasten to an upper chord of the joist and a second portion adapted to engage a support structure and support the joist and bearing a load, and a second steel plate welded to the main steel plate and extending downwardly from the main steel plate between the first and second portions, fastening the joist seat to an end portion of a joist with the main steel plate fastened to the upper chord of the joist and the second steel plate fastened with a lateral portion and an upwardly extending support portion to the end portion of the joist adapted to resist transfer load on the joist seat, and positioning the joist with the second portion of the joist seat engaging a support structure adapted to support the end portion of the joist by a portion of the joist seat.

The method of constructing a joist support system may also include the joist seat being directly or indirectly fastened to the upper chord of the joist. The end portion of the joist may extend inwardly from the end of the joist to a second web member adapted to resist transfer loads on the joist seat. The method may also include positioning a plurality of said assembled joists in a lateral array with a joist seat at the end portions of each joist supported on the support structure, assembling a corrugated decking supported by the plurality of the positioned joist with the decking extending over the main steel plate of the joist, and placing a cementitious slab over the corrugated decking. Additionally, the method may further include, prior to placing a cementitious slab, positioning a plurality of stand-off fasteners along the joist and coupled through the decking into the upper chord of the joist and extending above the decking such that when the cementitious slab is placed over the corrugated decking a portion of each stand-off fastener is encapsulated in the cementitious slab. The stand-off fasteners may be positioned along the joist with spacing between stand-off fasteners greater at center portions of the joist than at the end portions of the joist adjacent to joist seat.

Also disclosed is a method of constructing a joist support system comprising assembling a joist seat comprising a main steel plate having a first portion adapted to weld to an upper chord of the joist and a second portion adapted to engage a support structure and support the joist and bearing a load, and a second steel plate welded to the main steel plate and extending downwardly from the main steel plate between the first and second portions, welding the joist seat by the first portion to an end portion of a joist with the main steel plate welded to the upper chord of the joist and the second steel plate welded with a lateral weld portion and an upwardly extending weld portion to the end portion of the joist adapted to extend inwardly from the end of the joist to resist transfer load on the joist seat, and positioning the joist with the second portion of the joist seat engaging a support structure adapted to support the end portion of the joist by a portion of the joist seat.

Also disclosed is a method of constructing a joist support system comprising assembling a joist seat comprising a main steel plate having a first portion adapted to weld to an upper chord of the joist and a second portion adapted to engage a support structure and support the joist and bearing a load, and a second steel plate welded to the main steel plate and extending downwardly from the main steel plate between the first and second portions to engage the end portion of a joist shoe extending inwardly below the upper chord adapted to resist transfer loads on the joist seat, welding the joist seat by the first portion of the main steel plate to the upper chord of the joist and the second steel plate welded to end portions of the joist shoe adapted to resist transfer load on the joist seat, and positioning the joist with a second portion of the joist seat engaging a support structure adapted to support the one end portion of the joist by a portion of the joist seat.

The method of constructing a joist system may also include where the joist shoe is comprised of two abutting L-shaped members spaced apart by a web member, and the abutting L-shaped members may be positioned adjacent the upper chord of the joist in an arrangement selected from the group consisting of toe-to-toe, overlapping, or gapped. The method of constructing a joist system may further include positioning at least two assembled joists with their joist seats engaging the support structure and extending in opposite directions from the support structure, and connecting the main steel plates of the joist seats of the joists extending in opposite directions from the support structure. Additionally, the method may include assembling a corrugated decking supported by the plurality of the positioned joists with the decking extending over the main steel plates of the joists extending in opposite directions and the connection there between, and placing a cementitious slab over the corrugated decking.

The features, functions, and advantages that have been discussed maybe achieved independently in various embodiments of the present invention or may be combined in yet other embodiments, further details of which can be seen with reference to the following description and drawings but are not limited to only these applications shown.

BRIEF DESCRIPTION OF THE DRAWINGS

Figure 1:
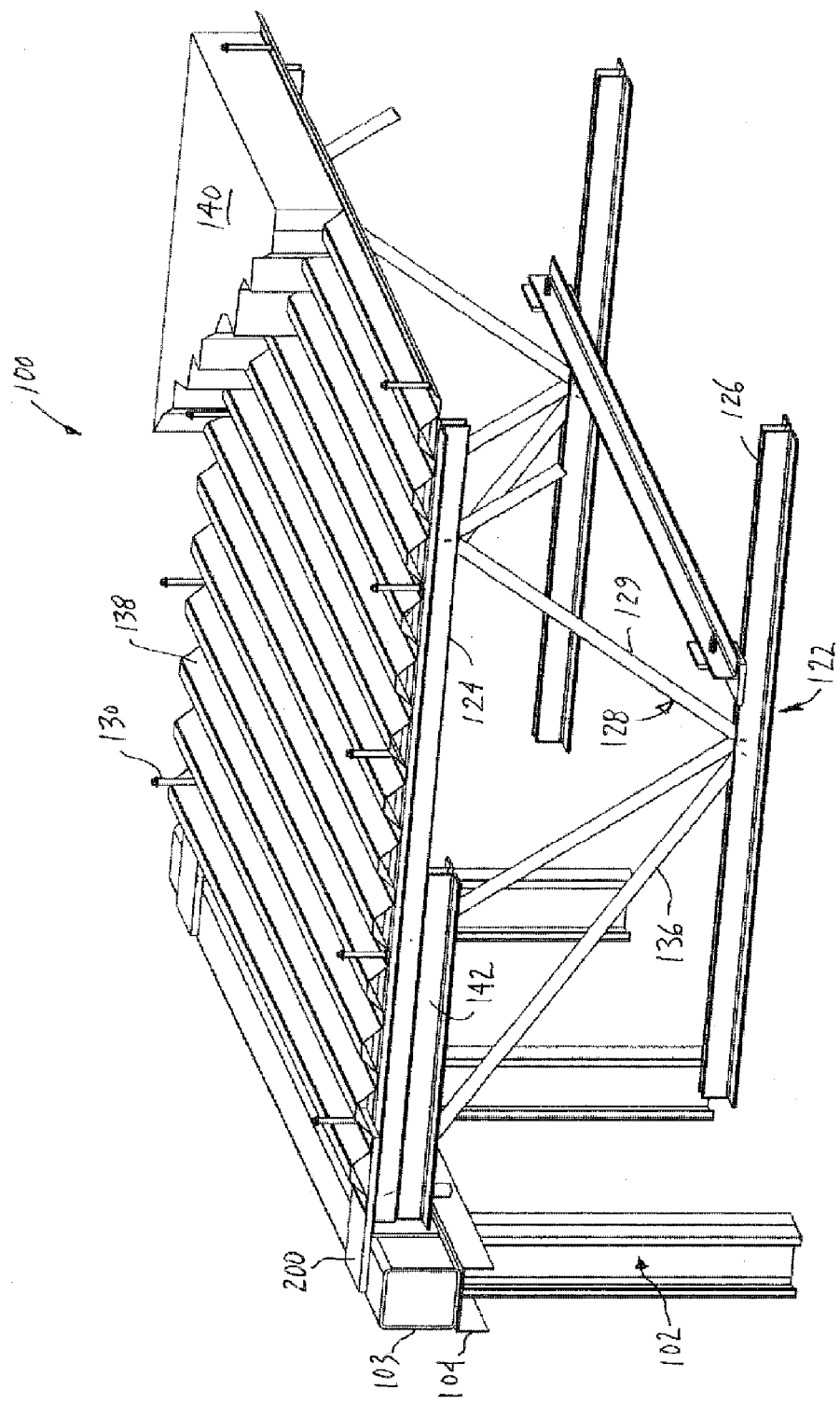
Figure 2A:
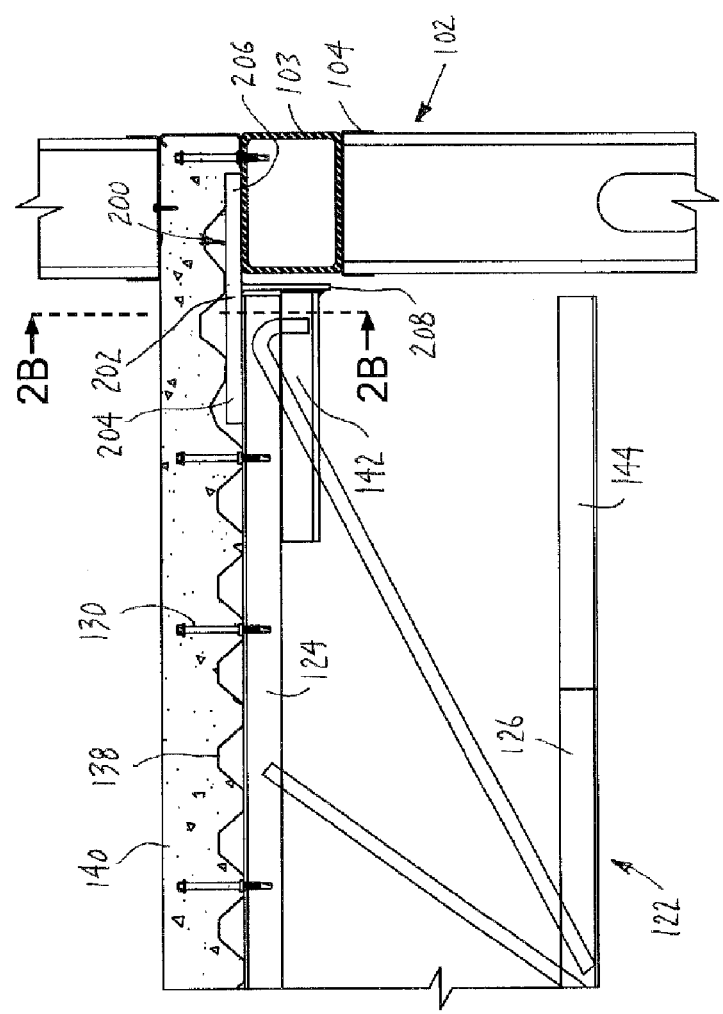
Figure 2B:
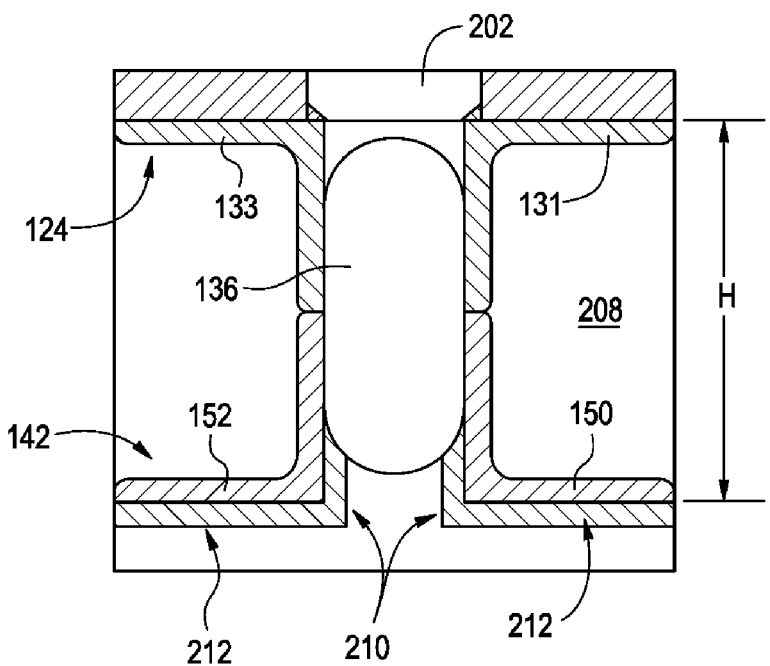
Figure 4B:
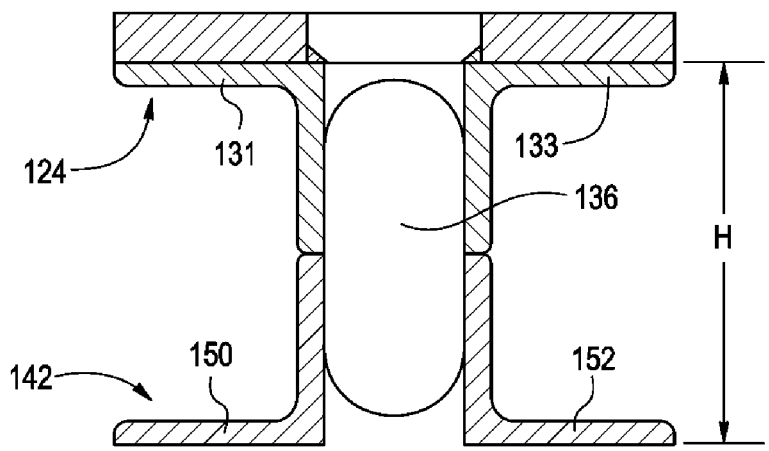
Figures 3A, 3B:
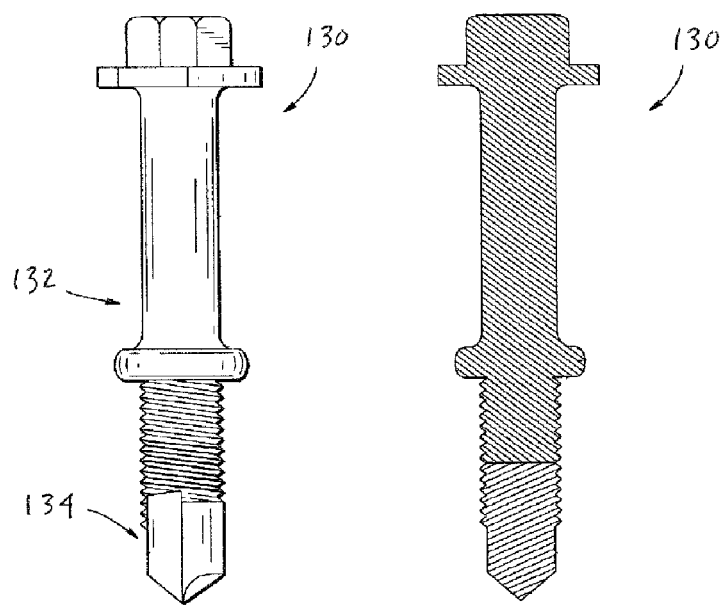
Figure 4A:
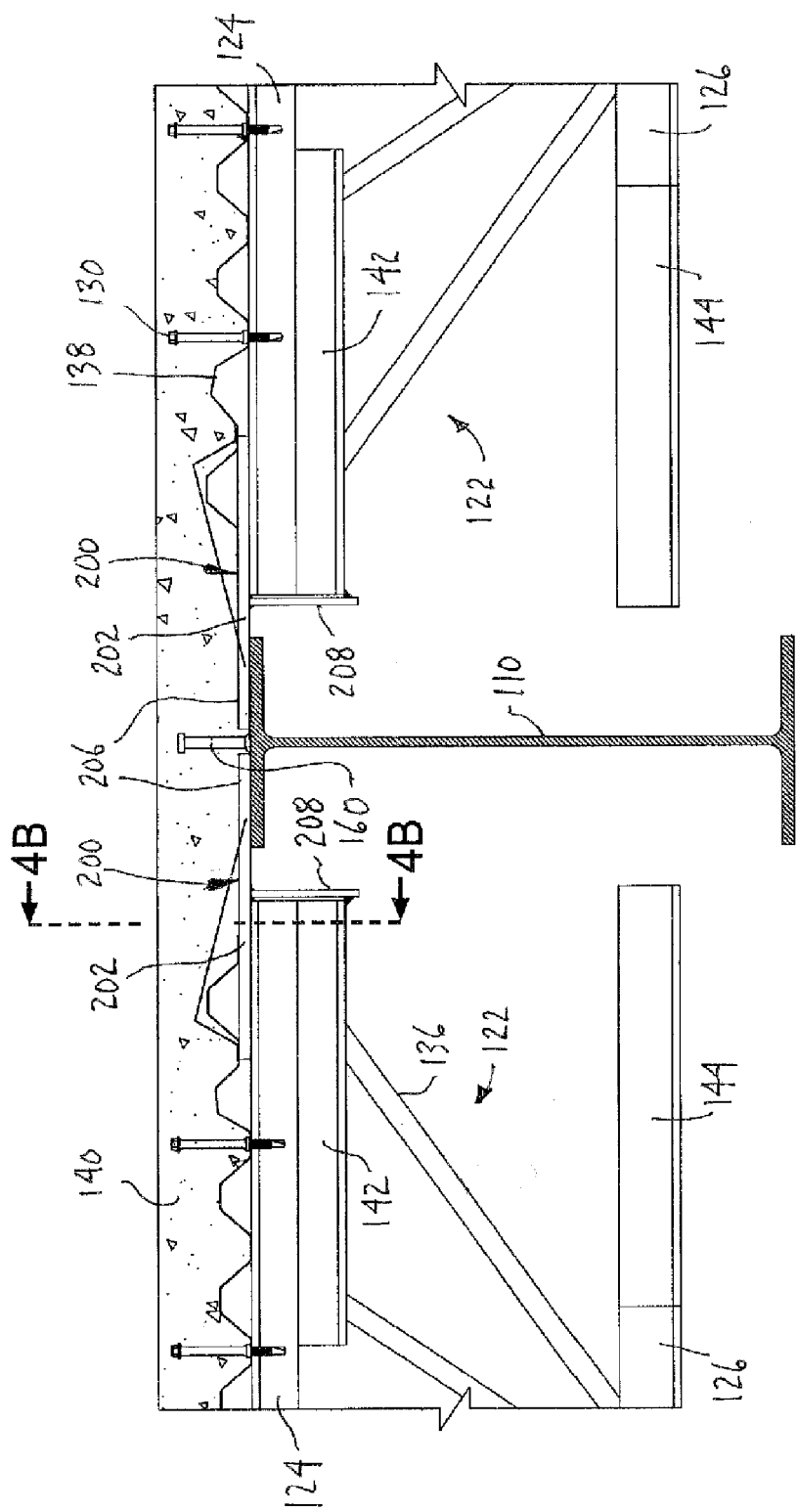
Figure 4C:
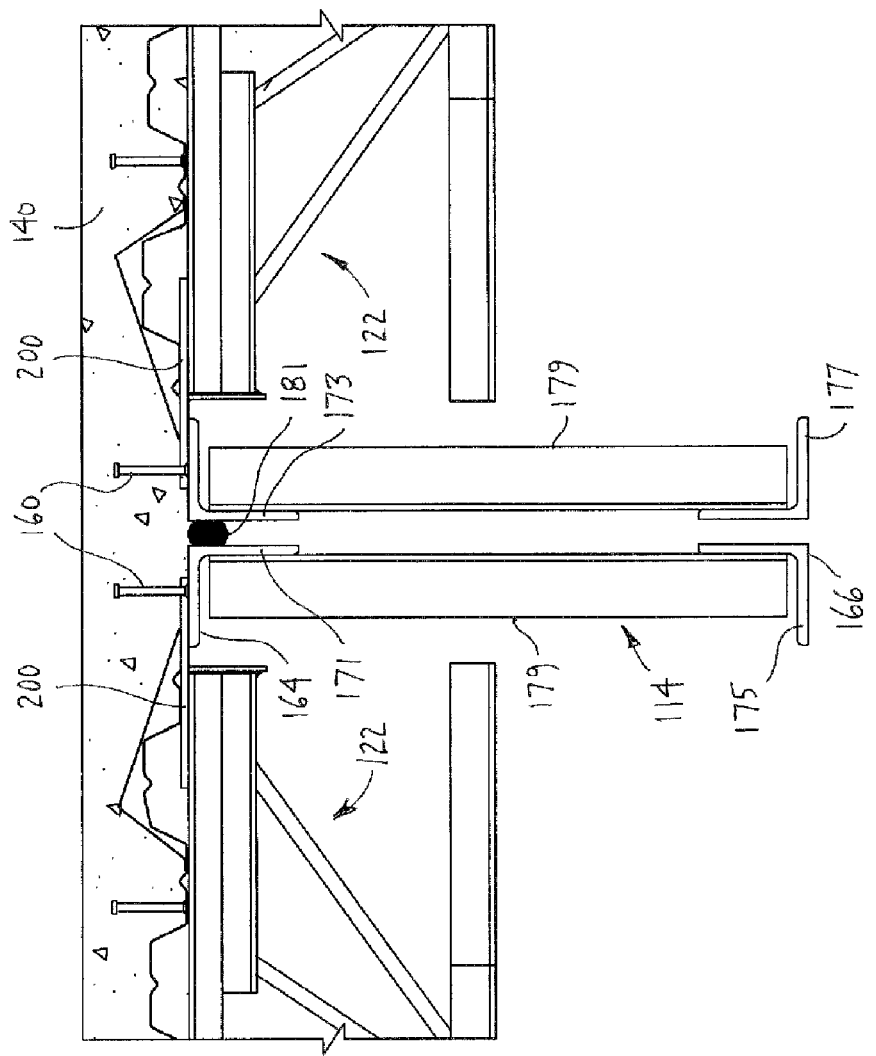
Figure 5A:
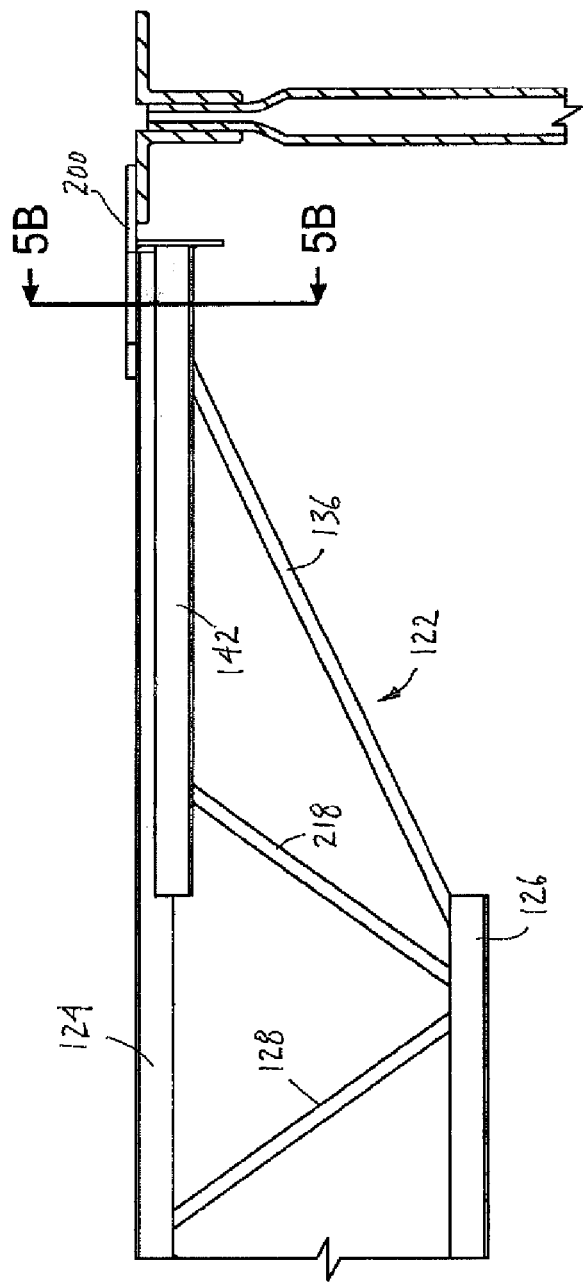
Figure 5B:
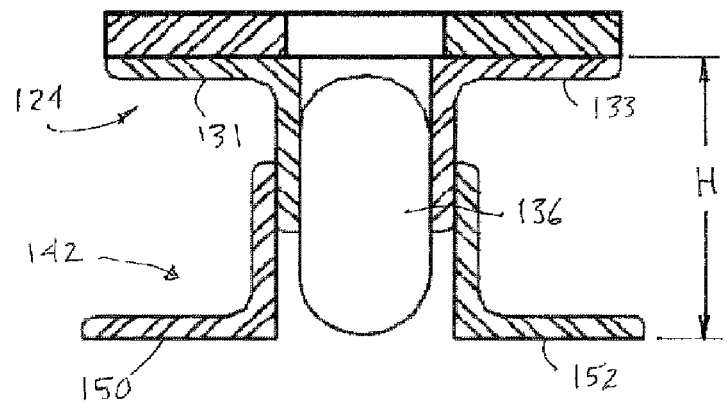
Figure 6B:
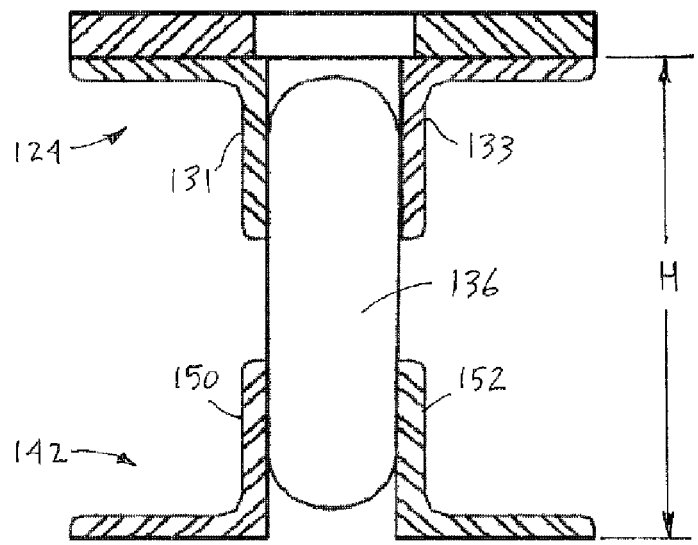
Figure 6A:
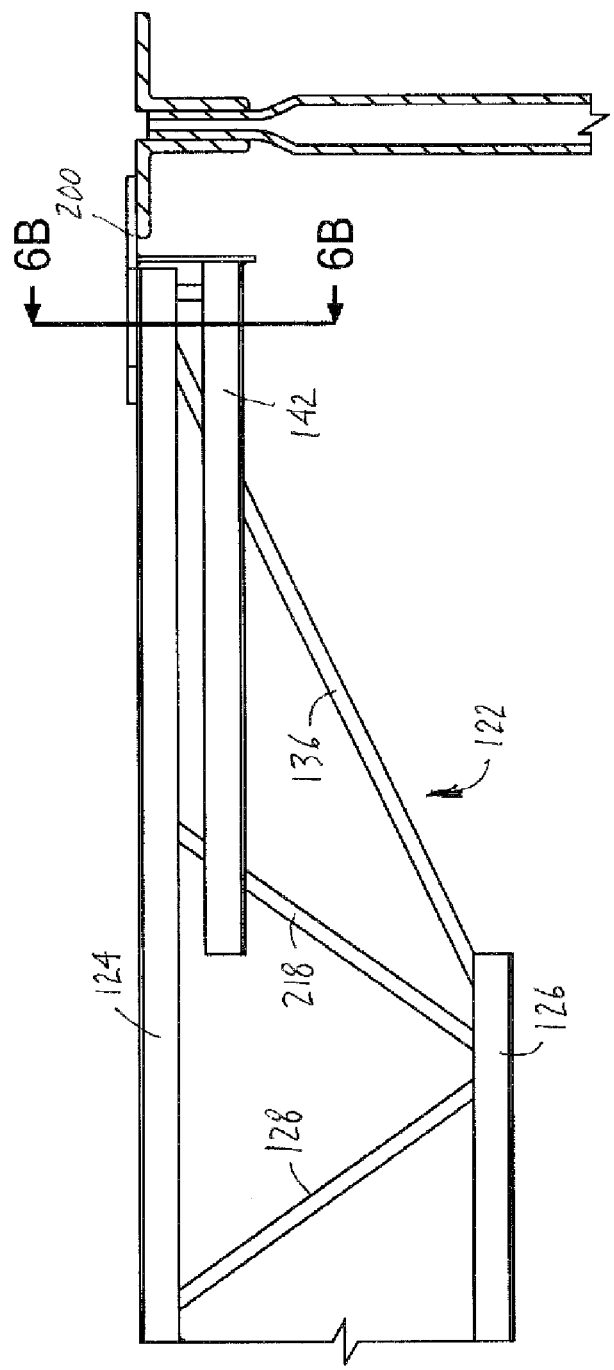
Figure 7A:
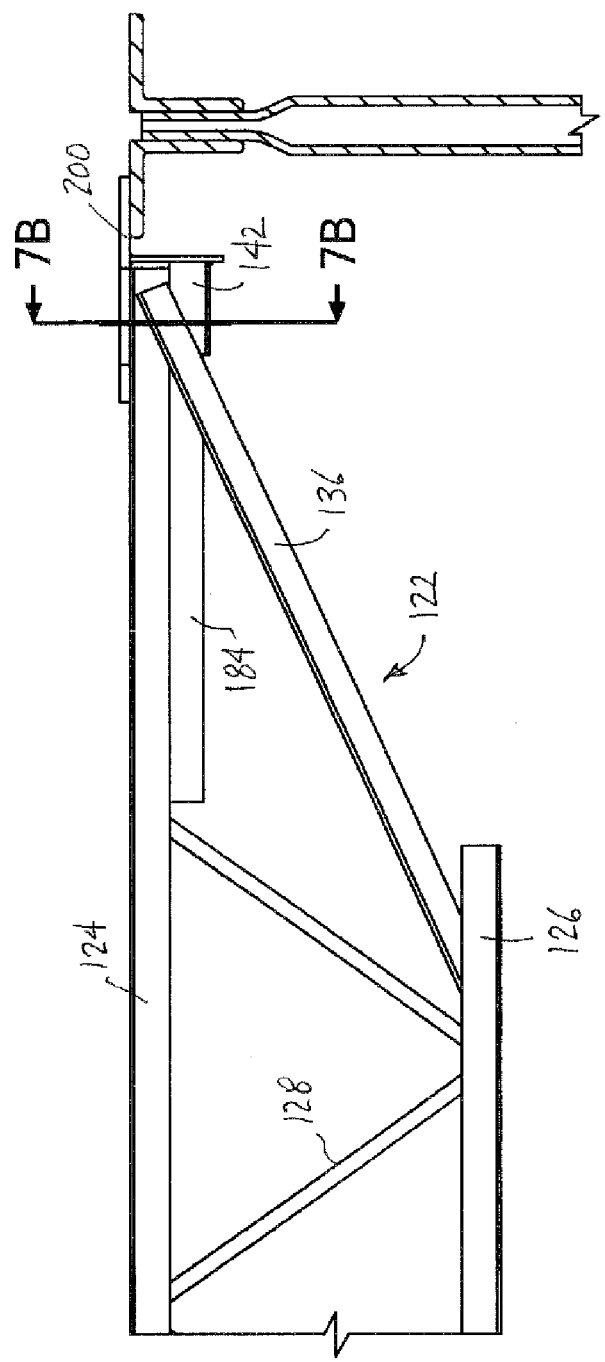
Figure 7B:
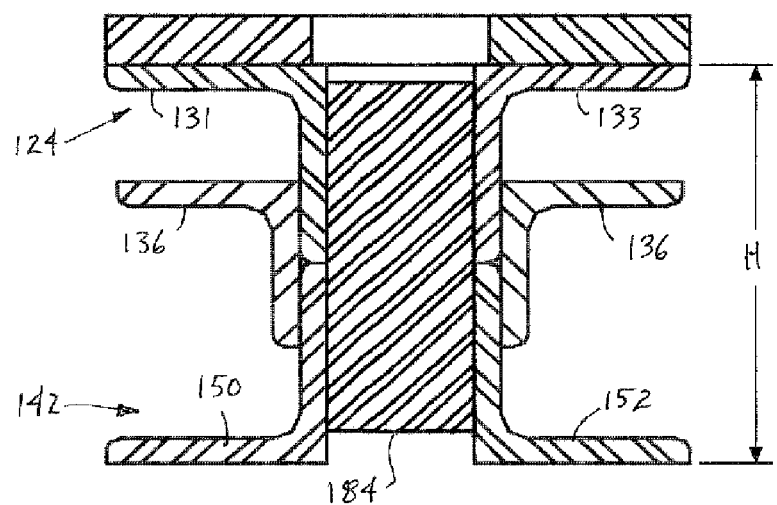
Figure 8A:
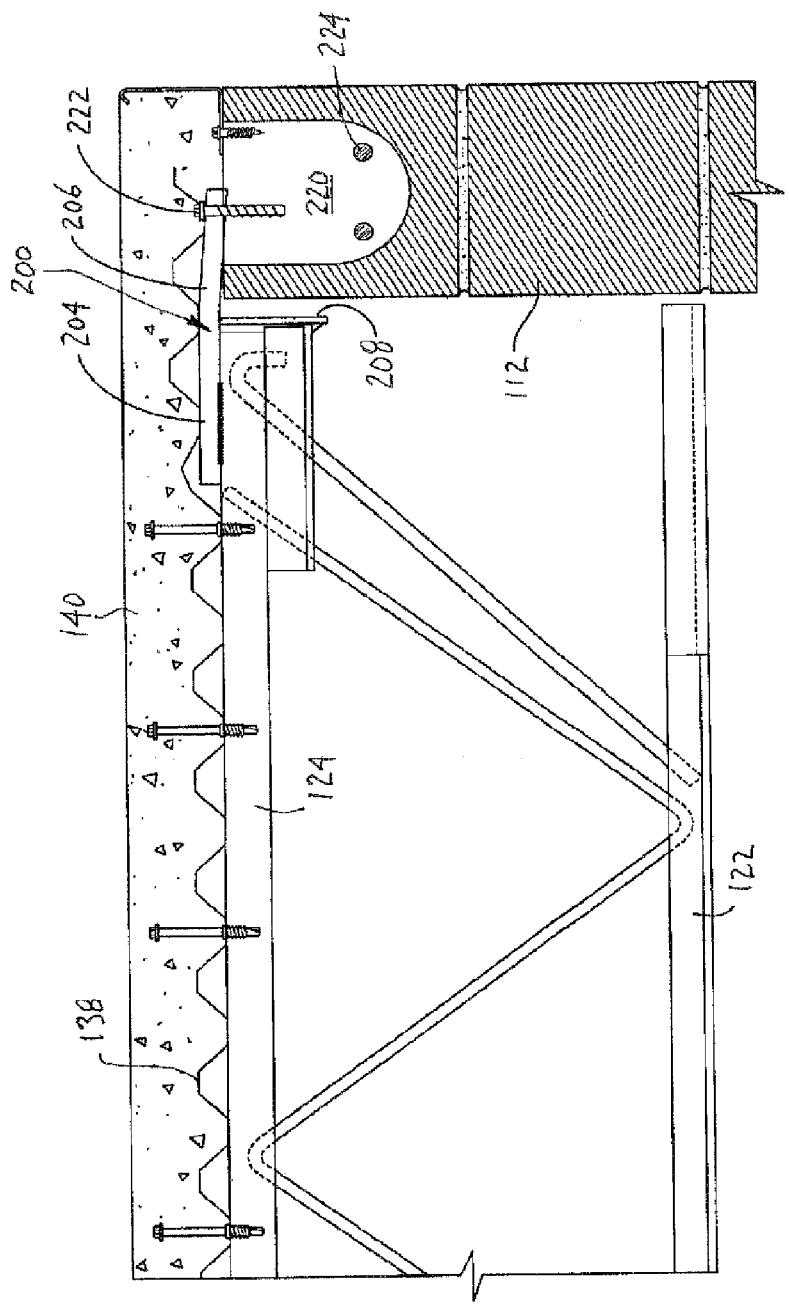
Figure 8B:
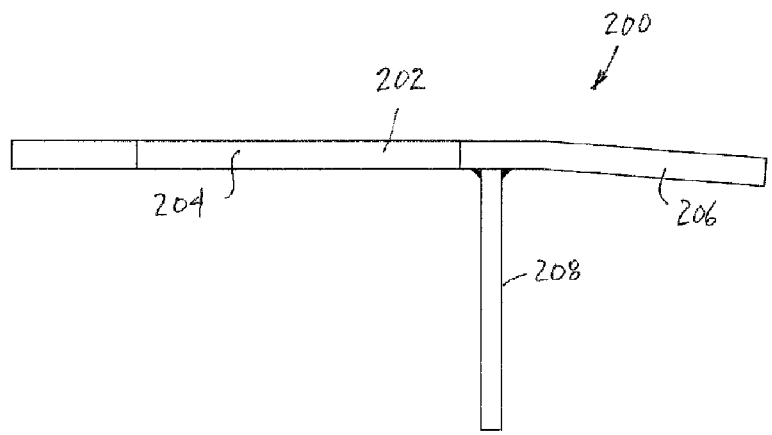
Figure 9B:
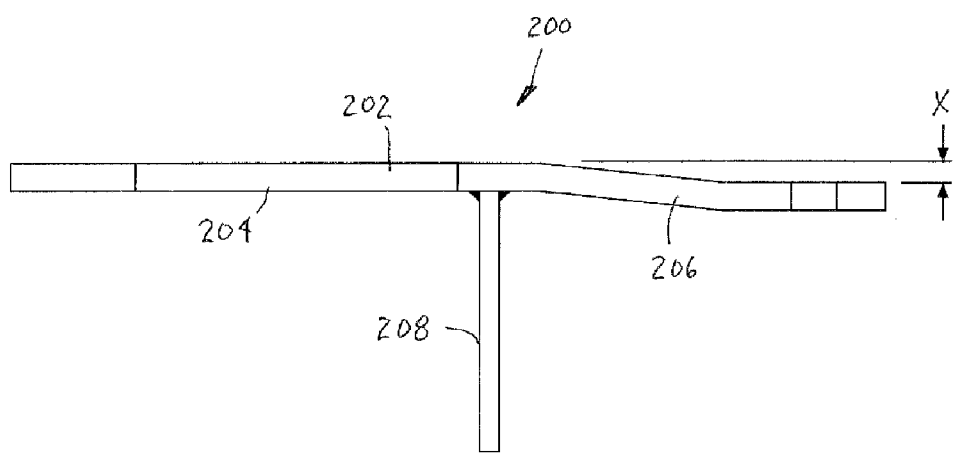
Figure 9A:
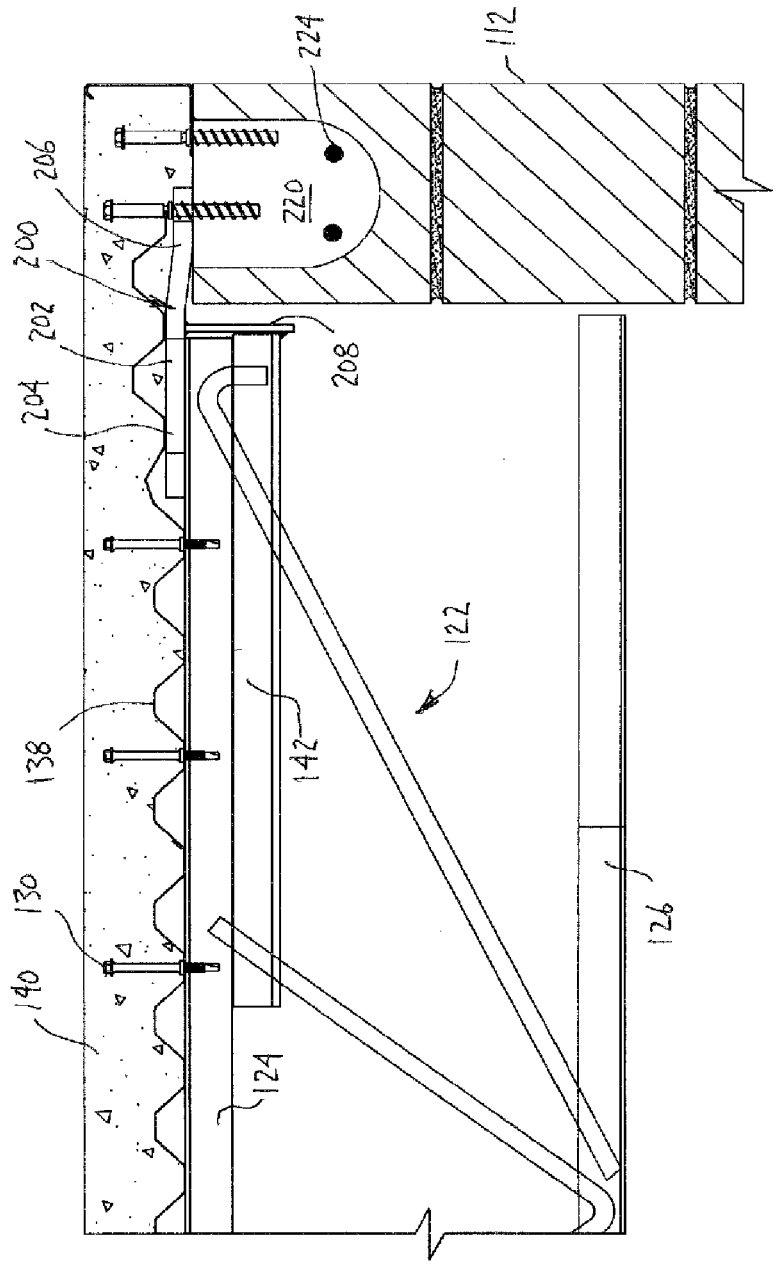
Figure 10:
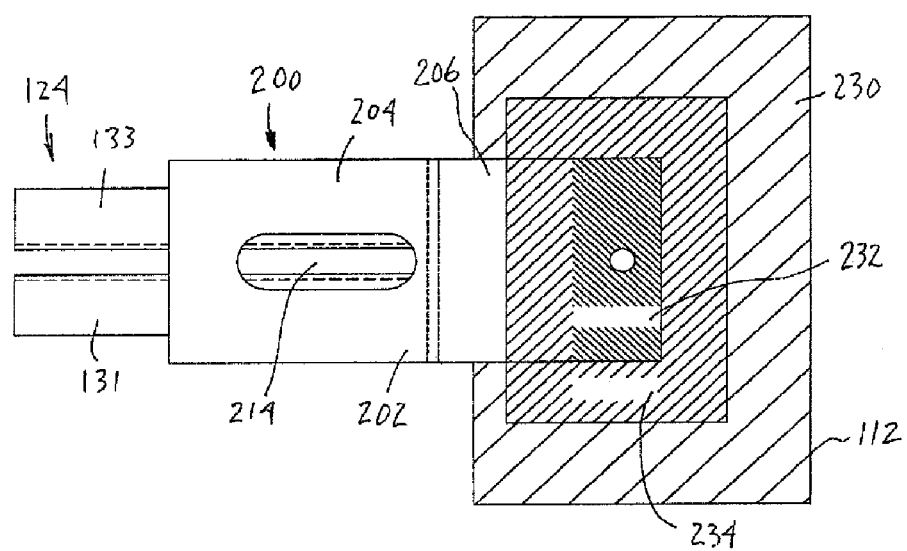
Figure 11:
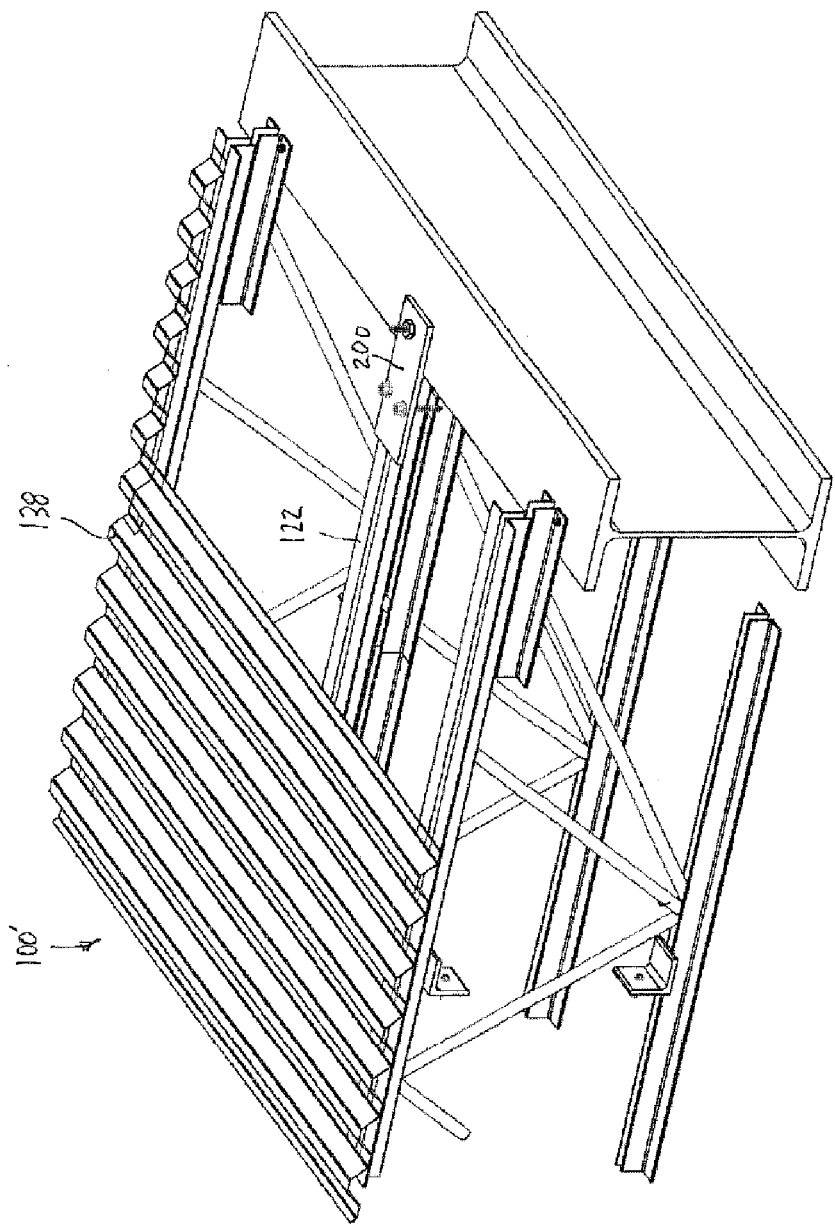
Figure 12:
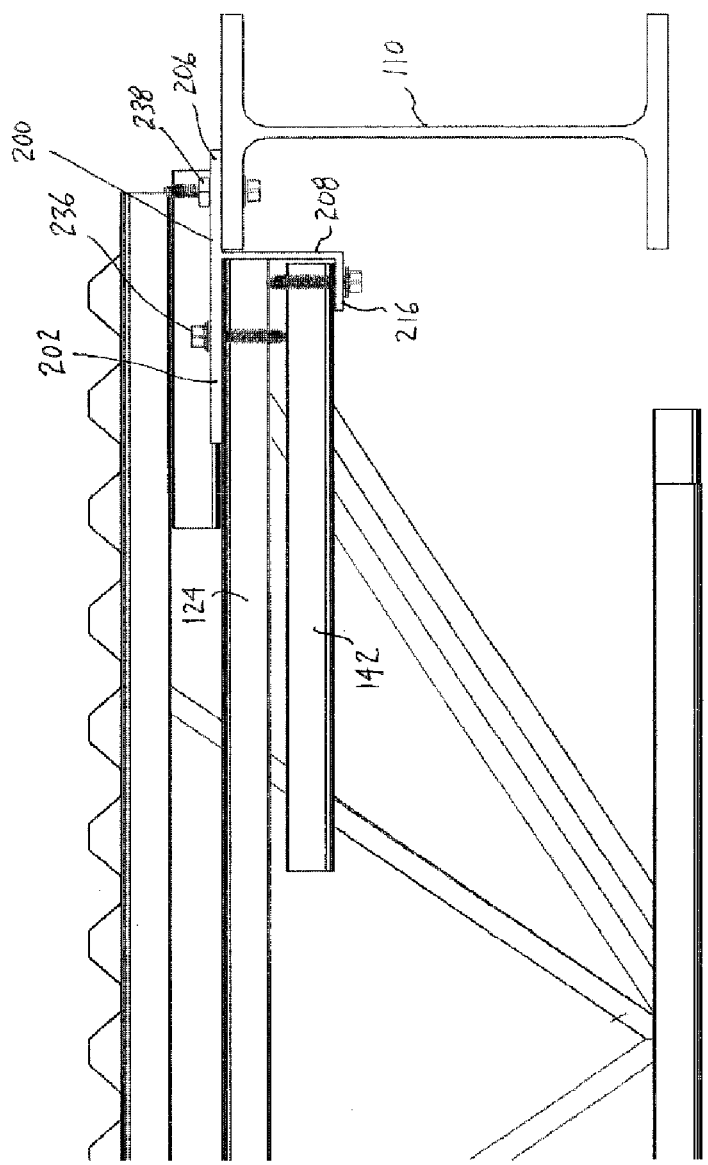
Figure 13:
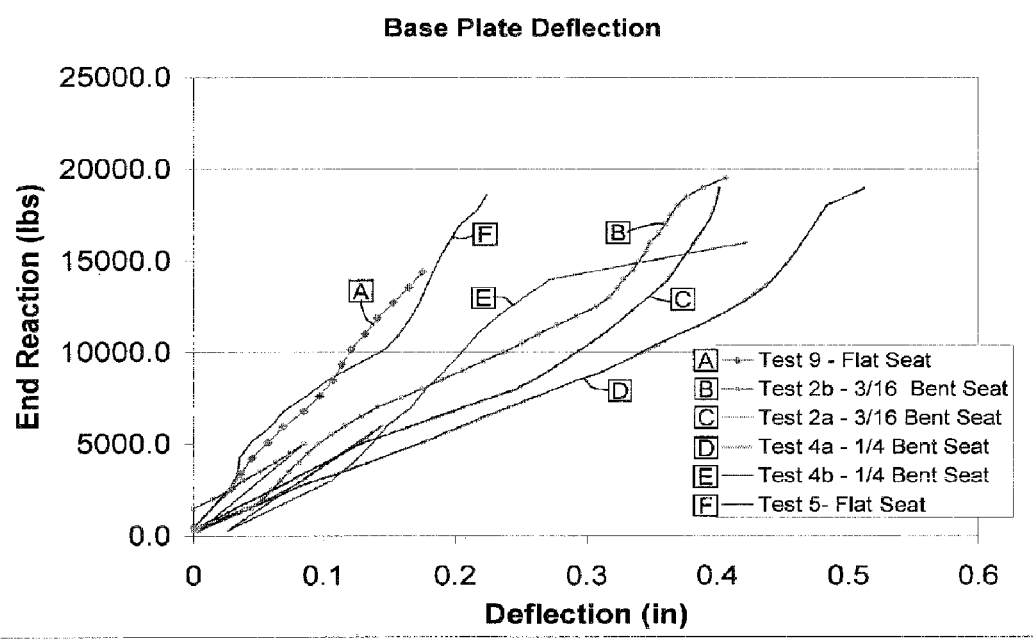
Figure 14:
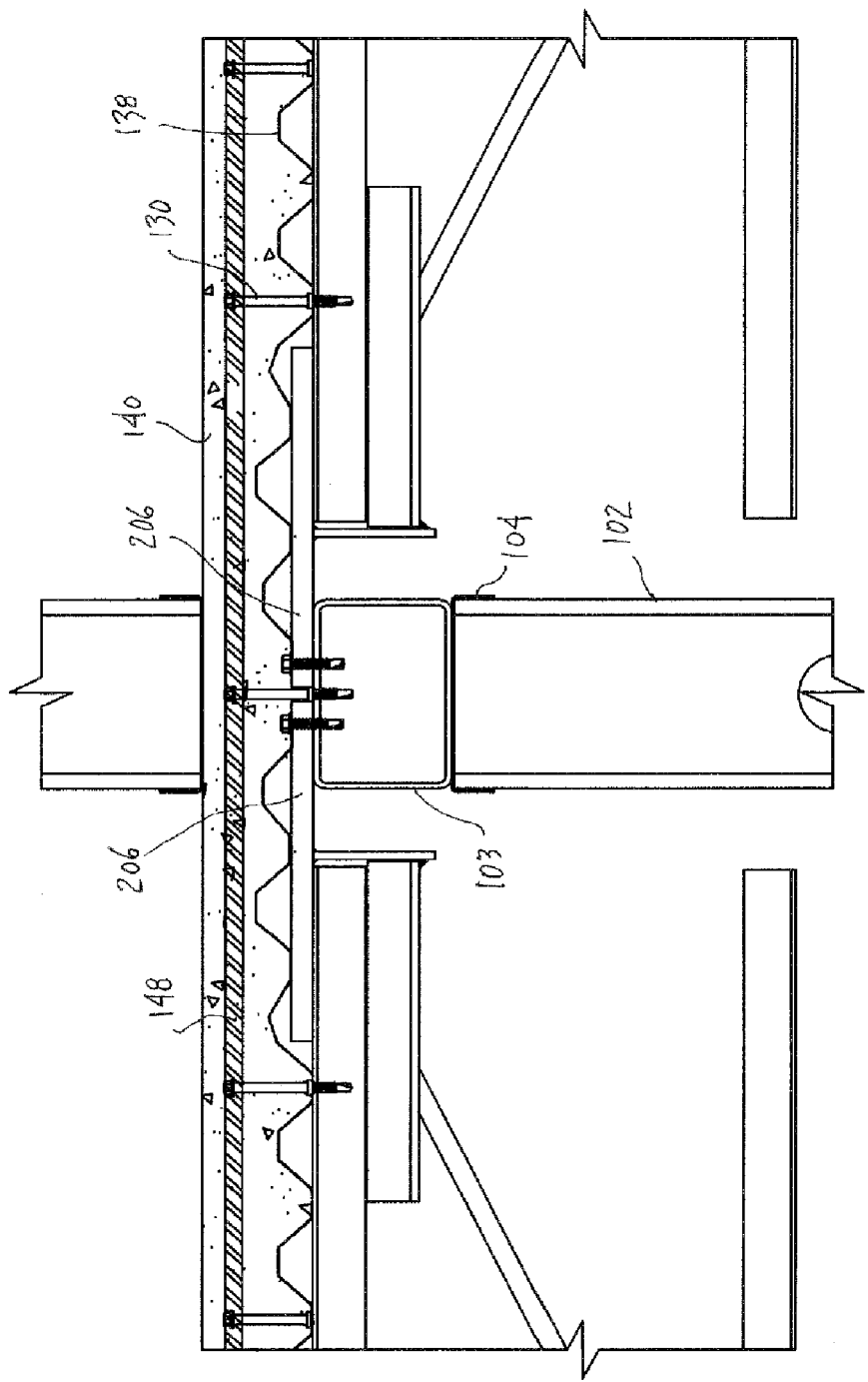

Having thus described embodiments of the invention in general terms, reference will now be made to the accompanying drawings, which are not necessarily drawn to scale, and wherein:

FIG. 1 illustrates a cross-sectional perspective view of a joist support system;

FIG. 2A illustrates a cross-sectional view of a joist support system where the joist has a joist seat and where the joist seat is supported by a wall running substantially perpendicular to the joist;

FIG. 2B illustrates a cross-sectional view of a joist seat taken along line 2B-2B in FIG. 2A;

FIG. 3A illustrates a side view of a stand-off fastener;

FIG. 3B illustrates a cross-sectional side view of the stand-off fastener illustrated in FIG. 3A;

FIG. 4A illustrates another joist support system where two opposing joists are supported by a steel beam;

FIG. 4B illustrates a cross-sectional view of a joist seat taken along line 4B-4B in FIG. 4A;

FIG. 4C illustrates a joist support system where two opposing joists are supported by a joist girder;

FIG. 5A illustrates a cross-sectional view of another joist support system;

FIG. 5B illustrates a cross-sectional view of a joist seat taken along line 5B-5B in FIG. 5A;

FIG. 6A illustrates a cross-sectional view of another joist support system;

FIG. 6B illustrates a cross-sectional view of a joist seat taken along line 6B-6B in FIG. 6A;

FIG. 7A illustrates a cross-sectional view of another joist support system;

FIG. 7B illustrates a cross-sectional view of a joist seat taken along line 7B-7B in FIG. 7A;

FIG. 8A illustrates a joist support system where the joist seat is pre-bent;

FIG. 8B illustrates a detail view of the joist seat of FIG. 8A;

FIG. 9A illustrates another joist support system where the joist seat is pre-bent;

FIG. 9B illustrates a detail view of the joist seat of FIG. 9A;

FIG. 10 illustrates a top view of the joist seat of FIG. 9A;

FIG. 11 illustrates a perspective view of an assembled floor structure;

FIG. 12 illustrates a detail view of the joist seat illustrated in FIG. 11;

FIG. 13 illustrates test data for various implementations of the present disclosure; and FIG. 14 illustrates another joist support system where two opposing joists are supported by a wall and the composite floor system includes reinforcing in the floor.

DETAILED DESCRIPTION OF THE DRAWINGS

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

The joist support systems described herein are generally constructed at the building site and provide structural support for the building. In general, a plurality of joists are provided and each joist is supported at either end by the building's support structures, which may include but are not limited to: beams, joist girders, masonry walls, concrete walls, cold-formed steel wall studs, and/or wood load bearing wall studs. In this way, the joists span the open areas within the building's main structure to provide support for the floors and/or ceilings. A plurality of varying flooring system designs and design methodologies are disclosed in U.S. patent application Ser. No. 12/709,102, filed Feb. 19, 2010, to Studebaker et al. and entitled "Composite Joist Floor System," which is incorporated herein by reference. These various designs and design methodologies use a combination of joist depth, chord size, joist spacing, flexible self-tapping stand-off screw size and spacing, and various corrugated steel deck profiles to create flooring systems that are light in weight, have generally decreased material cost and construction costs, and offer improved strength.

Referring to the drawings, FIG. 1 illustrates a cross-sectional perspective view of a building structure 100. As illustrated, the building structure may include at least one joist 122 supported on its ends by a support structure 102, such as a stud wall or beam. As shown in FIGS. 1 and 2A, the support structure 102 may, for example, comprise a plurality of steel studs. The stud wall includes the cold-formed distribution track 104, and may include a load distribution member 103, along the upper portion of the wall to distribute forces from the composite joist floor to the load bearing wall studs. The joist 122, in combination with other joists, walls, or beams (not shown), supports a layer of corrugated decking 138. The corrugated decking 138 is typically positioned such that the corrugations generally run generally perpendicular to the joist 122. A plurality of stand-off fasteners 130 may be drilled through the corrugated decking 138 into the joist 122 to form a composite joist support system. An example of a stand-off fastener 130 is illustrated in FIGS. 3A and 3B. Each stand-off fastener 130 may connect the corrugated decking 138 to the joist 122, and have an upper portion 132 (shown in FIG. 3A) extending some distance above the corrugated decking 138. When concrete 140 is placed over the corrugated decking 138, the upper portion 132 of the fasteners 130 are encapsulated within the concrete to form a composite joist system. The fasteners 130 may also have a lower portion 134 (shown in FIG. 3A) including a fluted tip capable of drilling through the corrugated decking and into the upper chord 124 of the joist 122. In various configurations, the joist system may be used to support a floor, ceiling or other component within the building structure 100.

As will be described in greater detail below, this composite joist support system allows for structures to be stronger, lighter, and/or more economical. Although the term "concrete" is often used herein when describing embodiments of the present invention, other embodiments of the present invention may use other cementitious materials or materials with properties similar to cementitious materials.

As illustrated in FIG. 1, the joist 122 comprises an upper chord 124 and a lower chord 126. The upper chord 124 and the lower chord 126 are joined together by a web 128 extending between the upper chord and the lower chord. The web 128 may have an open web configuration and may comprise one or more of rod, angle, or cold-formed "C" shaped members that extend between and are coupled to the upper chord 124 and the lower chord 126. As shown in FIG. 1, the web 128 may be formed from rod 129 bent into a zigzag or sinusoidal-like pattern having one or more peaks alternating with one or more valleys. The upper chord 124 may be welded (or otherwise coupled) to the peaks in the bent rod 129 and the lower chord 126 may be welded (or otherwise coupled) to the valleys in the bent rod 129.

The upper chord 124 and the lower chord 126 may each be formed from a pair of metal angles (also sometimes referred to as "angle irons," although the angles need not be iron). As shown in FIG. 2B, the upper chord 124 is formed from two angles 131, 133 positioned on either side of and coupled to bent rod 129, while the lower chord 126 is formed from two angles 135, 137 positioned on either side of and coupled to bent rod 129. The webs 128 are shown herein as bent rod 129, but can be almost any cross-sectional shape.

As further illustrated in FIG. 1, the joist 122 may also include an end diagonal 136 at one or both ends of the joist 122 for transferring forces between the joist 122 and the support structure 102. The end diagonal 136 may also be formed from angles, rod, or cold-formed "C"-shaped sections. The end diagonal 136 may be joined to the lower chord 126 proximate a first web joint and the other end of the end diagonal 136 may be joined to the upper chord 124 proximate to a joist seat 200 or a joist shoe 142.

Referring to FIG. 2A, the lower chord 126 of the joist 122 may include a ceiling extension 144 extending towards the support structure 102. A ceiling extension 144 may be desired so that a ceiling, or other structure, may be hung from the lower chord 126 of the joist adjacent the support structure 102.

Corrugated decking 138 may be positioned over a joist 122 and may span two or more adjacent joists. The corrugated decking 138 may be steel decking, and may be painted or galvanized. Standard corrugated steel decking may have a width of 32, 33, or 36 inches; however, additional and custom sizes may also be used as appropriate for specific installations. Besides coming in a variety of widths, standardized corrugated steel decking also comes in many different profiles, depending on the application. The corrugated decking 138 may be made from recycled materials, and in one example, may be made from 70% recycled materials.

As illustrated in FIG. 2A, the corrugated decking 138 may be positioned such that the corrugations are at substantially right angles to the joist 122. The stand-off fasteners 130 may be drilled through the corrugated decking 138 and the flanges of the upper chord 124, with the upper portion of the stand-off fasteners encapsulated in the concrete. As such, the fasteners 130 may transfer horizontal shear forces between the cementitious slab 140 and the upper chord 124 of the joist 122 allowing the two structures to act more like a single unit. The composite structure may be significantly stronger and/or material and labor may be reduced in the floor system over non-composite systems. The concrete 140 shall be designed with sufficient compressive strength to resist the compressive forces in the composite structure.

The stand-off fasteners 130 function may function as a shear transfer mechanism. Since the concrete 140 may carry much of the compressive stresses that would otherwise have to be carried by the upper chord of the joist in a non-composite joist floor system, a composite joist floor system may allow the upper chord 124 to be reduced in size and weight. In this way, the material used in the structure can be reduced to reduce weight and costs. Alternatively, the material that would otherwise have been used in the upper chord 124 may be transitioned to increase the size and strength of the lower chord 126 to achieve significant increases in load capacity without an increase in material costs. Therefore, in some examples, the upper chord 124 of the joist 122 may be smaller than the lower chord 126 or may be formed from a lower strength material as compared to the material used to form the lower chord 126.

As described above, the end of the joist 122 may be supported by a beam, wall, or other support structure 102. The joist 122 may have a joist seat 200 at least at one end of the joist. Each joist seat 200 may comprise a main steel plate 202 having a first portion 204 fastened to an upper chord 124 of the joist 122 and a second portion 206 adapted to engage a support structure 102 and support the joist 122 and a bearing load. The joist seat 200 also has a second steel plate 208 welded to the main steel plate and extending downwardly from the main steel plate between the first portion 204 and the second portion 206 adapted to be fastened to an end portion of the joist 122. Typically, the second steel plate 208 extends downward between about ⅛ inch and ½ inch below the lower surface of the joist shoe 142. The second steel plate 208 may be fastened with an upward support portion to an end portion of the joist 122 extending inwardly adapted to resist transfer load on the joist seat. The upward support portion may, in one example, be a weld as described below with reference to FIGS. 2A and 2B among others. In another alternative, the upward support portion may be an L-shaped portion as described below with reference to FIG. 12. The support structure 102 may be adapted to support the one end of the joist 122 by a portion of the joist seat 200.

In FIG. 2A, the joist seat 200 is illustrated with the first portion 204 of the main steel plate 202 fastened to the upper chord 124 of the joist 122. The first portion 204 may be welded to the upper chord 124 or otherwise secured to the upper chord with sufficient strength to support the joist and the bearing load. The second portion 206 of the main steel plate 202 is illustrated engaging a support structure 102. As shown, the joist seat 200 may support the joist 122 such that top of the upper chord 124 does not extend substantially above the top of the support structure 102 engaged by the second portion 206 of the main steel plate 202. In some examples, the joist seat 200 supports the joist 122 such that the top of the upper chord 124 may be substantially flush with the top of the support structure 102. In these configurations the main steel plate may be substantially horizontal, but need not be exactly horizontal. In some examples, described in greater detail below, the main steel plate 202 may be pre-bent. Additionally, during or after installation the main steel plate 202 may move, bend, or deform from its initial position so long as such movement is within the allowed tolerances for supporting the structure.

The joist seat 200 illustrated in FIG. 2A may enable a joist 122 to be supported with a decreased overall building height. In some prior systems, a joist extended onto the top of the support structure such that the upper chord of the joist and the joist shoe extended above the top of the support structure. As compared to these prior systems, the height of the building structure may be reduced by the height of the upper chord of the joist and the joist shoe as used in prior configurations. This height is represented by the dimension H as illustrated in FIGS. 2B and 4B among others. The reduced height may be greater than or less than H in some installations depending upon the specific configuration selected for comparison. For example, the height of a given floor may be reduced by several inches using the joist seat 200. Reducing the height of a given floor may substantially reduce the overall height of a building, as a reduction in height may be achieved on one or more floors. A reduction in building height may also reduce the weight of the building and the overall material cost for the building structure. Although a reduced height between floors may be achieved, a reduced height between floors is not required as the joist seat 200 may be utilized in designs where the height between floors is comparable to that achieved using prior methods. In addition to cost savings, other benefits may be achieved. For example, some localities impose overall height restrictions on buildings. The present disclosure may enable the construction of buildings with an extra floor or level while still complying with these height restrictions.

Referring now to FIG. 2B, a cross-sectional view of the system in FIG. 2A is illustrated. In FIGS. 2A and 2B, the main steel plate 202 is illustrated fastened to the angles 131, 133 of the upper chord of the joist 122. A joist shoe 142 having two angles 150, 152 as shown in FIG. 2B is illustrated extending below the upper chord 124. The joist shoe 142 may extend inwardly along the upper chord 124 from near the end of the upper chord 124 adjacent the support structure 102 for a distance as necessary to achieve the desired strength. The second steel plate 208 is illustrated fastened to the angles 150,152 of the joist shoe 142 by welds. The second steel plate 208 may be fastened to the joist shoe 142 with an upward weld portion 210 and a lateral weld portion 212. The upward weld portion 210 and the lateral weld portion 212 may secure the joist seat 200 to the joist 122 and assist in transferring load between the joist seat and the joist. In another example, the second steel plate 208 may be welded to the end of the upper chord 124 of the joist 122 by welding the second steel plate 208 to the angles 131, 133. Other fastening techniques are contemplated and may be used with other examples of the joist seat 200. For example bolts 236, with or without nuts 238, may be used to fasten the main steel plate 202 to the upper chord 124 of the joist as illustrated in FIGS. 11 and 12. Additionally, the joist shoe 142 may be installed to extend slightly beyond the end portion of the joist 122 to reduce interference during installation and facilitate fastening the end portion of the joist 122 to the second steel plate 208 of the joist seat 200. In one example, the joist shoe 142 may extend between ⅛ inch and ¼ inch beyond the end of the joist 122.

Additional configurations of the joist support system are also possible. For example, referring to FIGS. 4A and 4B, a joist support system utilizing a structural beam 110 supporting at least two joists 122 extending in opposite directions is illustrated. As shown, the end portion of the joist 122 to which the second steel plate 208 is fastened may comprise the joist shoe 142 positioned below and extending inwardly from the end of the joist to a second web member adapted to resist transfer loads on the joist seat 200. FIG. 4B provides another cross-sectional view looking inwardly, illustrating the relationship between the upper chord 124, the joist shoe 142, and the main steel plate 202 from FIG. 4A. In FIG. 4A, the structural beam 110 may support joists 122 extending in opposite directions each having joist seat 200 engaging the structural beam. Each joist seat 200 has a main steel plate 202 with a second portion 206 engaging the structural beam 110. The joists 122 may be positioned along the structural beam 110 such that the joists are substantially aligned or the joists 122 may be offset along the length of the structural beam 110, as desired. The second portions 206 of each steel plate may be sized to extend not more than half way across the structural beam 110 so as to avoid interference between the second portions 206 when the joists 122 are installed. The joist support system may also comprise ceiling extensions 144 extending from the lower chord 126 of each joist 122. In this configuration, the ceiling extensions may form a substantially continuous structure for supporting a ceiling extending underneath the structural beam 110.

A plurality of the stand-off fasteners 130 may be provided through the corrugated decking 138 into the joist 122 as shown in FIG. 4A, with the upper portion encapsulated within the concrete to form a composite joist system. As discussed above, the composite structure may be provided to transfer horizontal shear forces between the cementitious slab 140 and the upper chord 124 allowing the two structures to act more like a single unit. Alternately or in addition, headed concrete anchors 160 may be welded to the structural beam 110 and encapsulated within the concrete to further transfer shear forces to the beam 110.

Referring to FIG. 4A, the size and weight of a structural beam 110 may be determined based upon the load the structural beam 110 is required to support. In many installations, the depth of the structural beam 110 may be increased with a corresponding reduction in the weight and cost of the beam. However, increasing the depth of the structural beam 110 may reduce the usable area, for example floor to ceiling height, within a given level of the building structure. Using the joist seat 200 presently disclosed, the depth available for a structural beam 110 may be increased by approximately the dimension H illustrated in FIG. 4B. By reducing the space or height consumed by the joist above the structural beam 110, more space or height may be allocated for the structural beam 110 allowing for the use of beam with a greater depth, reduced weight, and corresponding lower cost. Alternatively, the space saved by the joist seat presently disclosed may allow for a greater useable area between a floor and ceiling for ducting, plumbing, wiring, or other building systems. As will be apparent, the depth, weight, and cost of a structural beam and the useable floor-to-ceiling space and load capacity of a building structure are interrelated. The joist seat of the present disclosure may provide greater flexibility in designing building systems with desired tradeoffs between these various factors.

The joist seat 200 may be fastened to the end portion of the joist 122 prior to installation of the joist. Alternatively, the joist seat 200 may be fastened to the end portion of the joist 122 after the joist is positioned. In one example, a joist 122 may be positioned adjacent a support structure and held in place with temporary supports. A joist seat 200 may then be fastened to the end portion of the joist 122 and engage the support structure to secure the joist. Alternatively, the joist seat 200 may be fastened to the end portion of the joist and then the combined joist 122 and joist seat 200 may positioned to engage the support structure.

Alternatively, as shown in FIG. 4C, the joist seats 200 may be supported by a joist girder 114. The joist girder 114 includes an upper chord 164 formed from two angles 171, 173 and a lower chord 166 formed from two angles 175, 177, with web members 179 there between. A backer rod 181 may be provided between angle 171 and angle 173 in the upper chord 164 to prevent concrete from flowing between the angles when concrete is placed and cured. The backer rod 181 may be a flexible foam material or other suitable material to remain between the angles while the concrete is placed and cured.

Referring to FIGS. 5 through 7, other examples of joist support systems are disclosed where abutting L-shaped members, illustrated as angles 150, 152, forming the joist shoe 142 are positioned adjacent the upper chord 124 of the joist 122 in a variety of arrangements, including toe-to-toe, overlapping, and gapped. As shown in FIG. 5A, the joist shoe 142 may extend inwardly from the end portion of the joist 122 to engage a second web member 218. The joist shoe 142 may be secured to the second web member 218 as well as the upper chord 124 of the joist 122 to transfer greater forces between the joist seat 200 and the joist 122. A joist shoe 142 may comprise a pair of spaced part inward facing L-shaped members, such as angles 150, 152, with a web 128 of the joist 122 positioned there between extending inwardly along the upper chord 124 to resist transfer load on the joist seat 200. Referring to FIG. 5B, the angles 150, 152 of the joist shoe 142 may overlap the angles 131, 133 of the upper chord 124 of the joist 122. Referring to FIGS. 6A and 6B, the joist shoe 142 may be positioned below the upper chord 124 such that a gap is formed between the upper chord 124 and the joist shoe 142. In this configuration, the joist shoe 142 may be welded to the web 128 including a second web member 218 and to the end diagonal 136. In yet another example shown in FIGS. 7A and 7B, the end diagonal 136 may be an angle extending between the lower chord 126 and the upper chord 124 and fastened to the joist shoe 142. As shown in FIGS. 7A and 7B, a reinforcing member 184 may be provided between the angles 131, 133 of the upper chord 124 of the joist 122 and the angles 150, 152 of the joist shoe 142 to increase the load capacity of the joist. Other methods of increasing the capacity of the joist system may also be employed such as the upper chord 124 of the joist 122 being larger near the end of the joist 122 than near the center portion of the joist 122.

Referring now to FIGS. 8A and 8B, the main steel plate 202 of the joist seat 200 may be pre-bent downwardly prior to applying a load to the joist 122 such that the main steel plate 202 moves to provide more support area with the support structure when the joist 122 is loaded. The joist support system illustrated in FIG. 8A may be generally constructed as previously discussed with the first portion 204 of the main steel plate 202 fastened to the upper chord 124 of the joist 122, and the second portion 206 of the main steel plate 202 engaging the support structure. The support structure in FIG. 8A may be a masonry wall 112, such as a concrete block or brick wall. Other support structures may also be employed such as a wood or steel stud wall, a cementitious wall, a metal beam, or a metal truss. The masonry wall 112 may include a concrete-filled channel 220 running through the uppermost blocks or bricks in the masonry wall 112. Rebar 224 or other reinforcement also may be used to reinforce the concrete-filled channel 220. Self-aligning fasteners, such as masonry screws 222, may be used to secure the joist seat 200 to the masonry wall 112. For example, the second portion 206 of the main steel plate 202 may be formed with one or more apertures to receive a masonry screw 222. Alternatively, the self-aligning fastener or masonry screw 222 may be a masonry fastener adapted to secure the second portion 206 to the masonry wall 112.

As illustrated in FIG. 8B, the main steel plate 202 is pre-bent such that the first portion 204 of the main steel plate 202 is slightly higher than the second portion 206 of the main steel plate 202. The second steel plate 208 is welded to the main steel plate between the first portion 204 and the second portion 206. Upon installation, the pre-bent main steel plate 202 may position the joist 122 slightly higher relative to the top of the support structure than a non-bent main steel plate. Corrugated decking 138 may then be installed and concrete 140 placed onto the corrugated decking. The joist 122 may bear the weight of the corrugated decking 138 and the concrete 140. The load on the joist 122 may cause the main steel plate to bend, increasing the engagement between the second portion 206 and the upper portion of the support structure, such as the masonry wall 112. For example, in a masonry wall installation, the increased engagement between the second portion 206 of the main steel plate 202 and the masonry wall 112 may reduce stress near the edges of the concrete-filled channel 220. It may be desired to concentrate the stress near the center of the concrete-filled channel 220 to improve the load bearing capacity of the support structure. The extent to which the main steel plate 202 may be pre-bent and the extent to which the main steel plate 202 bends or deforms under the load of the concrete 140 may be determined for specific installations and building configurations. In another example, the pre-bent main steel plate 202 may bend or deform under the weight of the decking and concrete resulting in the joist 122 being positioned substantially flush with the top of the support structure 102.

Referring to FIG. 9, yet another example of the joist support system is illustrated. In FIG. 9A, the joist seat 200 may be pre-bent as previously discussed, and the pre-bend may comprise a complex or double bend. The complex bend may be generally referred to as an S-shaped bend. The main steel plate 202 may be pre-bent to achieve a desired offset, illustrated in FIG. 9B by the dimension "x", between the first portion 204 and the second portion 206 of the main steel plate 202. In some configurations, the offset may be between 1/16 inch and 1/2 inch, or alternatively between 1/8 inch and 3/8 inch. Other offsets may be selected, and the offset may be selected such that under load the joist seat deforms to a substantially flush position as previously described.

The joist seat 200 having a complex bend may facilitate installation in certain environments. For example, the complex bend in the main steel plate 202 may enable the first portion 204 of the main steel plate to remain substantially parallel with the upper chord 124 of the joist 122, while the second portion 206 of the main steel plate 202 remains substantially parallel with the upper portion of the support structure, such as a masonry wall 112. In such an example, a bent portion may extend between the first portion 204 and the second portion 206 of the main steel plate 202, and the second steel plate 208 may be welded to the main steel plate at either end of such a bent portion or within the bent portion.

As shown in FIG. 9B, the joist seat 200 having a complex bend may also position the joist slightly above the upper portion of the support structure. As previously discussed, after the application of corrugated decking and concrete, the main steel plate 202 may bend or deform to increase the engagement of the second portion 206 with the support structure.

Referring to FIG. 10, a top view of the joist seat 200 of FIG. 9B is illustrated. As shown, the main steel plate 202 may have an opening 214 adapted to permit welding on a web member of the joist through the opening. The opening 214 may be positioned in the first portion 204 of the main steel plate 202. The opening 214 may provide access for welding or otherwise securing the web (not shown) to the angles 131, 133 of the upper chord 124 of the joist 122. The opening 214 may also provide access for inspecting of welds. The opening 214 may also provide access for welding the web to the joist shoe. After installation of the joists, corrugated decking may be supported by a plurality of the joists positioned laterally, with the decking extending over the main steel plate 202, such that a cementitious slab may be placed over the corrugated decking. Additionally, a plurality of stand off fasteners may be positioned along the joist and coupled through the corrugated decking into the upper chord 124 of the joist and extending above the decking, such that a cementitious slab may be placed over the corrugated decking encapsulating the stand-off fasteners. In some examples, the spacing between stand-off fasteners may be greater at center portions of the joist than at the end portions of the joist adjacent to joist seats. The spacing of stand-off fasteners may be selected to achieve a desired transfer of horizontal shear forces between the concrete and the joist.

The second portion 206 of the main steel plate 202 may be secured to the support structure, such as a masonry wall 112, by a masonry screw. As shown in FIG. 10, the bearing load supported by the joist may then be transferred through the joist seat 200 to the top portion 230 of the masonry wall 112. The pre-bent main steel plate 202 may permit the forces associated with the bearing load to be transferred to a center portion 232 of the masonry wall 112. In this manner, the forces may thus be distributed throughout a larger supporting area 234 of the masonry wall, increasing the load bearing capacity of the building structure. In some configurations, the load bearing capacity may be increased up to approaching 100% based on applicable design principles.

Typically, joists are installed prior to assembling a floor structure above the joists. In some applications, a joist 122 may be installed underneath a preexisting floor or roof structure, such as shown in FIG. 11. For example, in an existing structure 100', a damaged joist may need to be replaced or a new joist added to increase the bearing capacity of the floor or roof. In another example, remodeling or other construction may require the addition of new joists to increase the support for a floor or other span. In such applications, the joist seat 200 may be used to install the joist beneath the existing decking 138.

As shown in FIG. 12, the second steel plate 208 of a joist seat 200 may include an L-shaped portion 216 adapted to upwardly engage the end portion of a joist. The L-shaped portion 216 may extend inwardly from the second steel plate 208 to support the end portion of the joist. As illustrated, the L-shaped portion 216 may be fastened to a joist shoe 142 by a fastener, such as a bolt 236. In one example, the bolt 236 may be a self-aligning fastener. The bolt 236 may be used with or without nuts 238 as appropriate for the installation. The bolt 236 may also be a self-drilling fastener. Similarly, the main steel plate 202 may be fastened to the upper chord 124 of the joist with similar fasteners. Depending upon the requirements of a specification installation, the fasteners may be installed from either the top or bottom of the joist to facilitate installation in an existing structure. Fasteners may also secure the second portion 206 of the main steel plate 202 to a support structure, such as a metal beam 110. Other fasteners and fastening techniques may also be used, such as welding of the joist seat 200 to the joist as previously discussed.

In one example, the installation of a joist 122 may begin by positioning and securing the second portion 206 of the main steel plate 202 of the joist seat 200 over a support structure separate from the joist. The joist 122 may then be moved into position engaging the first portion 204 of the main steel plate 202. For example, the joist 122 may be moved into position beneath a floor and be supported by the L-shaped portion 216 and/or temporary supports while the joist 122 is being fastened to the joist seat 200. Shim members (not shown) are typically installed to fill the gap between the upper chord 124 of the joist 122 and the structure above the joist such that the joist 122 may support the structure.

Referring now to FIG. 13, the relationship between load at the end of the joist seat 200 and deflection of the joist seat is shown. Six test samples are plotted in the graph of FIG. 13. Test samples B through F were tested with a vertical load greater than 15000 lbs, and sample A was tested with a vertical load of about 14000 lb. Test samples B and E were initially loaded to greater than 5000 lbs, then returned to no-load, then loaded to greater than 15000 lbs. In all of the samples, as shown in the graph, the deflection was less than 0.2 inches when tested with a vertical load of 5000 lbs.

Referring now to FIG. 14, another example of a joist support system is illustrated. As shown in FIG. 14, joists may be positioned extending in opposite directions from a support structure 102, such as a cold formed steel stud wall. The stud wall includes the cold-formed distribution track 104, and may include a load distribution member 103, along the upper portion of the wall supporting the second portion 206 of the joist seat. Corrugated decking 138 may be installed above the joists and secured to the joists with stand-off fasteners 130 as previously discussed. Similarly, the fasteners 130 may be used to secure the second portion 206 of the main steel plate of the joist seats to the support structure. The corrugated decking 138 may form a substantially continuous decking across the support structure 102 such that concrete 140 may be placed onto the decking. Reinforcing 148 such as rebar, welded wire fabric, or other reinforcing material may be installed with the decking and secured to the fasteners 130. The concrete 140 placed onto the corrugated decking 138 may encapsulate the fasteners 130 and the reinforcing 148. The concrete 140 may then be smoothed, for example, to form a floor of a building. As shown in FIG. 14, the reinforcing 148 may extend across the top of a support structure 102. In such a configuration, the reinforcing 148, such as rebar, wire welded fabric, may tie the concrete 140 together from each side of the support structure 102 and improve the overall strength of the concrete. The reinforcing may also be joined to the fasteners 130 to transfer forces between the joists and the concrete 140.

Referring generally to FIGS. 1-14, various methods of constructing a joist support system are possible within the scope of the present disclosure. For example, a method of constructing a joist support system may comprise assembling a joist seat 200 comprising a main steel plate 202 having a first portion 204 adapted to fasten to an upper chord 124 of the joist 122 and a second portion 206 adapted to engage a support structure 102 and support the joist and bearing load, and a second steel plate 208 welded to the main steel plate and extending downwardly from the main steel plate between the first and second portions, fastening the joist seat 200 to an end portion of a joist with the main steel plate fastened to the upper chord of the joist and the second steel plate fastened with a lateral support portion and an upwardly extending support portion to the end portion of the joist adapted to resist transfer load on the joist seat, and positioning the joist with the second portion of the joist seat engaging a support structure adapted to support the end portion of the joist by a portion of the joist seat.

Additionally, the joist seat 200 may be directly fastened to the upper chord 124 of the joist 122. Alternatively, the joist seat 200 may be indirectly fastened to the upper chord 124 of the joist 122. For example, a shim or intermediate member may be positioned between the first portion 204 of the main steel plate 202 and the upper chord of a joist. As previously described, the end portion of the joist may extend inwardly from the end of the joist to a second web member 218 adapted to resist transfer loads on the joist seat 200.

Another method of constructing a joist support system may comprise assembling a joist seat comprising a main steel plate having a first portion adapted to weld to an upper chord of the joist and a second portion adapted to engage a support structure and support the joist and bearing a load, and a second steel plate welded to the main steel plate and extending downwardly from the main steel plate between the first and second portions, welding the joist seat by the first portion to an end portion of a joist with the main steel plate welded to the upper chord of the joist and the second steel plate welded with a lateral weld portion and an upwardly extending weld portion to the end portion of the joist adapted to extend inwardly from the end of the joist to resist transfer load on the joist seat, and positioning the joist with the second portion of the joist seat engaging a support structure adapted to support the end portion of the joist by a portion of the joist seat.

Another method of constructing a joist support system may comprise assembling a joist seat comprising a main steel plate having a first portion adapted to weld to an upper chord of the joist and a second portion adapted to engage a support structure and support the joist and bearing a load, and a second steel plate welded to the main steel plate and extending downwardly from the main steel plate between the first and second portions to engage the end portion of a joist shoe extending inwardly below the upper chord adapted to resist transfer loads on the joist seat, welding the joist seat by the first portion of the main steel plate to the upper chord of the joist and the second steel plate welded to end portions of the joist shoe adapted to resist transfer load on the joist seat, and positioning the joist with a second portion of the joist seat engaging a support structure adapted to support the one end portion of the joist by a portion of the joist seat.

The methods of constructing joist support systems may also include positioning a plurality of said assembled joists in a lateral array with a joist seat at the end portions of each joist supported on the support structure, assembling a corrugated decking supported by the plurality of the positioned joists with the decking extending over the main steel plate of the joist, and placing a cementitious slab over the corrugated decking. For example, a lateral array of joists may include a plurality positioned transverse to support structures with a desired spacing for the load capacity required of a building structure. During installation of joists, joists are frequently moved into position and supported by a joist seat before fastened to support structures at either end of the joist. With prior designs, joists have been known to move or tip, for example when pushed by a gust of wind. The joist seat presently disclosed may reduce the tendency of unsecured joists to move or tip by lowering the center of gravity of the unsecured joist relative to the joist seat. Further, the configuration of the joist seat may reduce the range of motion through which a joist may move before the second steel plate contacts the support structure and inhibits further movement of the joist. By limiting movement of a joist prior to the joist being secured to the support structure, the joist seat presently disclosed may improve the safety of joist installation. The installation of joists employing the joist seats presently disclosed may also be facilitated by the use of a single fastener to secure the joist seat to a support structure. A single fastener may be placed near the center of the joist seat providing substantially symmetric support.

The method of constructing a joist support system may further include, prior to placing a cementitious slab, positioning a plurality of stand-off fasteners along the joist and coupled through the decking into the upper chord of the joist and extending above the decking such that when the cementitious slab is placed over the corrugated decking a portion of each stand-off fastener is encapsulated in the cementitious slab.

The methods of constructing a joist support system may also include positioning at least two assembled joists with their joist seats engaging the support structure and extending in opposite directions from the support structure, and connecting the main steel plates of the joist seats of the joists extending in opposite directions from the support structure. In one example, the main steel plates 202 of the joist seats 200 may be connected by welding. The methods of constructing a joist support system may further include assembling a corrugated decking supported by the plurality of the positioned joists with the decking extending over the main steel plates of the joists extending in opposite directions and the connection there between, and placing a cementitious slab over the corrugated decking.

Although embodiments of the present disclosure described herein are generally described as providing a floor structure for a building, it will be apparent to one of ordinary skill in the art that other embodiments of the present disclosure can be similarly used to provide a roof or ceiling structure for a building.

Specific embodiments of the present disclosure are described herein. Many modifications and other embodiments of the invention set forth herein will come to mind to one skilled in the art to which the disclosure pertains having the benefit of the teachings presented in the foregoing descriptions and the associated drawings. Therefore, it is to be understood that the disclosure is not to be limited to the embodiments disclosed and that modifications and other embodiments are intended to be included within the scope of the appended claims. Although specific terms are employed herein, they are used in a generic and descriptive sense only and not for purposes of limitation.

What is claimed is:

1. A joist support system comprising:
a joist having a joist seat at least at one end, the joist seat comprising a main steel plate having a first portion fastened to an upper chord of the joist and a second portion adapted to engage a support structure and support the joist and a bearing load, and a second steel plate welded to the main steel plate and extending downwardly from the main steel plate between the first and second portions, the second steel plate fastened with an upward support portion to an end portion of the joist extending inwardly adapted to resist transfer load on the joist seat, and
a support structure adapted to support the one end of the joist by a portion of the joist seat.

2. The joist support system as claimed in claim 1 where the end portion of the joist to which the second steel plate is fastened comprises a joist shoe positioned below and extending inwardly from the end of the joist to a second web member adapted to resist transfer load on the joist seat.

3. The joist support system as claimed in claim 2 where the main steel plate is capable of being fastened to the upper chord and the second steel plate is capable of being fastened to the joist shoe after the joist is positioned.

4. The joist support system as claimed in claim 1 where an opening is provided in the main steel plate adapted to permit welding on a web member of the joist through the opening.

5. The joist support system as claimed in claim 1 where the main steel plate is capable of being fastened to the upper chord and the second steel plate is capable of being fastened to the end portion of the joist after the joist is positioned.

6. The joist support system as claimed in claim 5 where the second steel plate includes an L-shaped portion adapted to upwardly engage the end portion of the joist.

7. The joist support system as claimed in claim 1 where the second steel plate includes an L-shaped portion adapted to upwardly engage the end portion of the joist.

8. The joist support system as claimed in claim 1 where the main steel plate is fastened to the support structure by self-aligning fasteners.

9. The joist support system as claimed in claim 1 where the support structure is selected from the group consisting of a metal stud, a masonry wall, a cementitious wall, a metal beam, and a metal truss.

10. A joist support system comprising:
a joist having a joist seat at least at one end, the joist seat comprising a main steel plate having a first portion welded to an upper chord of the joist and a second portion adapted to engage a support structure and support the joist and a bearing load, and a second steel plate welded to the main steel plate and extending downwardly from the main steel plate between the first and second portions, the second steel plate welded with a lateral weld portion and an upward weld portion to an end portion of the joist extending inwardly to resist transfer load on the joist seat, and
a support structure adapted to support the one end of the joist by a portion of the joist seat.

11. The joist support system as claimed in claim 10 where the end portion of the joist to which the second steel plate is fastened comprises a joist shoe positioned below the upper chord positioned adjacent at least one end of the joist, and with the second steel plate welded with a lateral weld portion and an upward weld portion to the joist shoe extending inwardly to resist transfer load on the joist seat.

12. The joist support system as claimed in claim 11 where the joist shoe extends at least slightly beyond the end of the upper chord.

13. The joist support system as claimed in claim 11 where each joist shoe comprises a pair of spaced apart inward facing L-shaped members with a web of the joist positioned there between extending inwardly along the upper chord to resist transfer load on the joist seat.

14. The joist support system as claimed in claim 10 where the support structure is selected from the group consisting of a metal stud, a masonry wall, a cementitious wall, a metal beam, and a metal truss.

15. The joist support system as claimed in claim 10 where the main steel plate is pre-bent downwardly prior to applying a load to the joist such that the main steel plate moves to provide more support area with the support structure when the joist is loaded.

16. The joist support system as claimed in claim 10 further comprising:
corrugated decking supported by a plurality of the joists positioned laterally, with the decking extending over the main steel plate of the joist seats, and
a cementitious slab placed over the corrugated decking.

17. The joist support system as claimed in claim 10 further comprising:
corrugated decking supported by a plurality of the joists positioned laterally, with the decking extending over the main steel plate of the joist seats,
a plurality of stand-off fasteners positioned along the joist and coupled through the decking into the upper chord of the joist and extending above the decking, and
a cementitious slab placed over the corrugated decking and encapsulating the stand-off fasteners.

18. The joist support system as claimed in claim 17 where the stand-off fasteners are positioned along the joist with spacing between stand-off fasteners greater at center portions of the joist than at the end of the joist adjacent to the joist seats.

19. A method of constructing a joist support system comprising:
a. assembling a joist seat comprising a main steel plate having a first portion adapted to fasten to an upper chord of a joist and a second portion adapted to engage a support structure and a support the joist and bearing load, and a second steel plate welded to the main steel plate and extending downwardly from the main steel plate between the first and second portions,
b. fastening the joist seat to an end portion of the joist with the main steel plate fastened to the upper chord of the joist and the second steel plate fastened with a lateral portion and an upwardly extending support portion to an end portion of the joist adapted to resist transfer load on the joist seat, and c. positioning the joist with the second portion of the joist seat engaging a support structure adapted to support the end portion of the joist by a portion of the joist seat.

20. The method of constructing a joist support system as claimed in claim 19 where the joist seat is directly fastened to the upper chord of the joist.

21. The method of constructing a joist support system as claimed in claim 19 where the end portion of the joist extends inwardly from the end of the joist to a second web member adapted to resist transfer load on the joist seat.

22. The method of constructing a joist support system as claimed in claim 19 where the second steel plate includes an L-shaped portion adapted to upwardly engage the end portion of the joist.

23. The method of constructing a joist support system as claimed in claim 19 where the support structure is selected from the group consisting of a metal stud, a masonry wall, a cementitious wall, a metal beam, and a metal truss.

24. The method of constructing a joist support system as claimed in claim 19 where the main steel plate is pre-bent downwardly prior to applying a load to the joist such that the main steel plate moves to provide more support area with the structural support when the joist is loaded.

25. The method of constructing a joist support system as claimed in claim 19 comprising the further steps of:
   d. positioning a plurality of joists in a lateral array with a joist seat at the end portions of each joist supported on the support structure,
   e. assembling a corrugated decking supported by the plurality of the positioned joists with the decking extending over the main steel plate of the joist seats, and
   f. placing a cementitious slab over the corrugated decking.

26. The method of constructing a joist support system as claimed in claim 25 comprising the further step between step (e) and (f) of:
   positioning a plurality of stand-off fasteners along the joists and coupled through the decking into the upper chord of the joists and extending above the decking such that when the cementitious slab is placed over the corrugated decking a portion of each stand-off fastener is encapsulated in the cementitious slab.

27. The method of constructing a joist support system as claimed in claim 26 where the stand-off fasteners are positioned along the joists with spacing between the stand-off fasteners greater at center portions of the joists than at the end portions of the joists adjacent to the joist seats.

28. A method of constructing a joist support system comprising:
   a. assembling a joist seat comprising a main steel plate having a first portion adapted to weld to an upper chord of a joist and a second portion adapted to engage a support structure and support the joist and bearing a load, and a second steel plate welded to the main steel plate and extending downwardly from the main steel plate between the first and second portions,
   b. welding the joist seat by the first portion to an end portion of the joist with the main steel plate welded to the upper chord of the joist and the second steel plate welded with a lateral weld portion and an upwardly extending weld portion to an end portion of the joist extending inwardly from the end portion of the joist to resist transfer load on the joist seat, and
   c. positioning the joist with the second portion of the joist seat engaging a support structure adapted to support the end portion of the joist by a portion of the joist seat.

29. The method of constructing a joist support system as claimed in claim 28 where the joist seat is directly welded to the upper chord of the joist.

30. The method of constructing a joist support system as claimed in claim 28 where an opening is provided in the main steel plate adapted to permit welding on a web member of the joist through the opening.

31. The method of constructing a joist support system as claimed in claim 28 where the end portion of the joist extends inwardly from the end of the joist to a second web member adapted to resist transfer load on the joist seat.

32. The method of constructing a joist support system as claimed in claim 28 where the support structure is selected from the group consisting of a metal stud, a masonry wall, a cementitious wall, a metal beam, and a metal truss.

33. The method of constructing a joist support system as claimed in claim 28 where the main steel plate is pre-bent downwardly prior to applying a load to the joist such that the main steel plate moves to provide more support area with the support structure when the joist is loaded.

34. The method of constructing a joist support system as claimed in claim 28 comprising the further steps of:
   d. positioning a plurality of joists in a lateral array with a joist seat at the end portions of each joist supported on the support structure,
   e. assembling a corrugated decking supported by the plurality of positioned joists with the decking extending over the main steel plate of the joist, and
   f. placing a cementitious slab over the corrugated decking.

35. The method of constructing a joist support system as claimed in claim 34 comprising the further step between step (e) and (f) of:
   positioning a plurality of stand-off fasteners along the joists and coupled through the decking into the upper chords of the joists and extending above the decking such that when the cementitious slab is placed over the corrugated decking a portion of each stand-off fastener is encapsulated in the cementitious slab.

36. The method of constructing a joist support system as claimed in claim 35 where the stand-off fasteners are positioned along the joists with spacing between the stand-off fasteners greater at center portions of the joists than at the end portions of the joists adjacent to the joist seats.

37. A method of constructing a joist support system comprising:
   a. assembling a joist seat comprising a main steel plate having a first portion adapted to weld to an upper chord of a joist and a second portion adapted to engage a support structure and support the joist and bearing a load, and a second steel plate welded to the main steel plate and extending downwardly from the main steel plate between the first and second portions to engage an end portion of a joist shoe extending inwardly below the upper chord adapted to resist transfer load on the joist seat,
   b. welding the joist seat by the first portion of the main steel plate to the upper chord of the joist and the second steel plate welded to the end portion of the joist shoe adapted to resist transfer load on the joist seat, and
   c. positioning the joist with the second portion of the joist seat engaging a support structure adapted to support the end portion of the joist by a portion of the joist seat.

38. The method of constructing a joist support system as claimed in claim 37 where the joist seat is directly welded to the upper chord of the joist.

39. The method of constructing a joist support system as claimed in claim 37 where an opening is provided in the main steel plate adapted to permit welding on a web member of the joist through the opening.

40. The method of constructing a joist support system as claimed in claim 37 where the joist shoe extends inwardly from the end of the joist to a second web member adapted to resist transfer load on the joist seat.

41. The method of constructing a joist support system as claimed in claim 37 where the joist shoe is coupled to the upper chord of the joist.

42. The method of constructing a joist support system as claimed in claim 37 where the joist shoe is comprised of two abutting L-shaped members spaced apart by a web member.

43. The method of constructing a joist support system as claimed in claim 42 where the abutting L-shaped members are positioned adjacent the upper chord of the joist in an arrangement selected from the group consisting of toe-to-toe, overlapping or gapped.

44. The method of constructing a joist support system as claimed in claim 37 where the support structure is selected from the group consisting of a metal stud, a masonry wall, a cementitious wall, a metal beam, and a metal truss.

45. The method of constructing a joist support system as claimed in claim 37 where the main steel plate is pre-bent downwardly prior to applying a load to the joist such that the main steel plate moves to provide more support area with the structural support when the joist is loaded.

46. The method of constructing a joist support system as claimed in claim 37 comprising the further steps of:
   d. positioning a plurality of joists in a lateral array with a joist seat at the end portions of each joist supported on the support structure,
   e. assembling a corrugated decking supported by the plurality of the positioned joists with the decking extending over the main steel plate of the joist, and
   f. placing a cementitious slab over the corrugated decking.

47. The method of constructing a joist support system as claimed in claim 46 comprising the further step between step (e) and (f) of:
   positioning a plurality of stand-off fasteners along the joists and coupled through the decking into the upper chord of the joists and extending above the decking such that when the cementitious slab is placed over the corrugated decking a portion of each stand-off fastener is encapsulated in the cementitious slab.

48. The method of constructing a joist support system as claimed in claim 47 where the stand-off fasteners are positioned along the joists with spacing between the stand-off fasteners greater at center portions of the joists than at the end portions of the joists adjacent to the joist seats.

49. The method of constructing a joist support system as claimed in claim 37 further comprising the steps of:
   d. positioning at least two joists with their joist seats engaging the support structure and extending in opposite directions from the support structure, and
   e. connecting the main steel plates of the joist seats of the joists extending in opposite directions from the support structure.

50. The method of constructing a joist support system as claimed in claim 49 further comprising the steps of:
   f. assembling a corrugated decking supported by at least two positioned joists seats with the decking extending over the main steel plates of the joists extending in opposite directions and the connection there between, and
   g. placing a cementitious slab over the corrugated decking.

* * * * *